United States Patent [19]

Saylor et al.

[11] Patent Number: 4,977,390

[45] Date of Patent: Dec. 11, 1990

[54] REAL TIME METHOD FOR PROCESSING ALAARMS GENERATED WITHIN A PREDETERMINED SYSTEM

[75] Inventors: Charles H. M. Saylor, Manlius; Kamal Jabbour, Syracuse, both of N.Y.

[73] Assignee: Niagara Mohawk Power Corporation, Syracuse, N.Y.

[21] Appl. No.: 423,872

[22] Filed: Oct. 19, 1989

[51] Int. Cl.$^5$ .............................................. G08B 19/00
[52] U.S. Cl. .................................... 340/521; 340/522; 340/506; 340/538; 340/310 R; 340/635; 371/4
[58] Field of Search ................... 340/521, 522, 310 R, 340/310 A, 310 CP, 538, 506, 635, 638; 371/4, 7, 9.1, 10.1, 15.1, 16.5, 18, 29.1, 29.5; 364/550, 138

[56] References Cited

U.S. PATENT DOCUMENTS

| | | | |
|---|---|---|---|
| 3,775,592 | 11/1973 | Ando et al. | 235/61.6 A |
| 4,388,715 | 7/1983 | Renaudin et al. | 370/13 |
| 4,442,240 | 5/1984 | Yoshida | 382/15 |
| 4,649,515 | 3/1987 | Thompson et al. | 364/900 |
| 4,749,985 | 6/1988 | Corsberg | 340/517 |
| 4,812,819 | 3/1989 | Corsberg | 340/517 |

OTHER PUBLICATIONS

An Expert System for Fault Section Estimation Using Information From Protective Relays and Circuit Breakers, C. Fukul and J. Kawakami, pp. 83–90, IEEE Transactions on Power Delivery, vol. PWRD 1, No. 4, Oct., 1986.
Consolidated Edison System Operation Computer Control System (SOCCS) Alarm Advisor, A. Shoop, S. Silverman and B. Ramesh, 6-1989.
Feasibility Study for an Energy Management System Intelligent Alarm Processor, B. Wollenberg, pp. 241–247, IEEE Transactions on Power Delivery, vol. PWRD 1, No. 2, May, 1986.
Toast: The Power System Operator's Assistant, S. Talukdar, E. Caradozo and L. Leao, pp. 53–60, Computer, Jul., 1986.
ALFA: Automated Load Forecasting Assistant, K. Jabbour, J. Riveros, D. Landsbergen and W. Meyer, pp. 1–6, 7-1987 IEEE.
Artificial Intelligence Method and Power System Fault Diagnosis, K. Komai and T. Sakaguchi, pp. 355–360, Second International Conference on Power System Monitoring and Control, 10-1986.
Expert System Manages Alarm Messages, G. Paula, pp. 47–48, Electrical World, Jul., 1989.
Enhancing Productivity in Power System Control Centers, David Curtics, pp. 49–51, EPRI Journal, Mar., 1989.
Artificial Intelligence Solutions to Power System Operating Problems, Schulte et al. pp. 920–926, IEEE Transactions on Power Systems, Nov., 1987.
Dispatcher Alarm and Message Processing, Amelink et al., pp. 188–194, IEEE Transactions on Power Systems, Aug., 1986.

*Primary Examiner*—Donnie L. Crosland
*Attorney, Agent, or Firm*—Heslin & Rothenberg

[57] ABSTRACT

A methodology for processing alarms generated within a predetermined system embodies a forward chaining approach to the analysis of alarms. Before an alarm set can be diagnosed, the method includes the steps of: providing a computer database representative of all components of the system capable of faulting and the interconnections between the components; providing rules that relate component faults to generated alarms and to propagation of component faults within the system; determining individual alarm patterns generated by separate faulting of each component of the system; and storing in a computer database individual alarm patterns determined for each component of the system. Thereafter, the method includes preparing each stored alarm pattern with a generated set of alarms and ascertaining those components whose individual alarm patterns are a subset of this set of alarms. A practical real time implementation of the method is obtained by including the steps of: hashing the individual alarm patterns determined for each system component to a binary pattern corresponding to a unique integer number; hashing the set of alarms to be analyzed to a binary representation; and comparing the alarm set binary representation with all binary patterns stored for the system components and ascertaining therefrom all potentially faulted components of the system.

18 Claims, 4 Drawing Sheets

| ELEMENT NAME | FAULT PATTERN | |
|---|---|---|
| (STATION-1 STATION-2 L-1) | (STATION-1 B-2) | (STATION-2 B-3) |
| | (STATION-2 B-1) | (STATION-2 B-2) |
| (STATION-1 STATION-2 L-2) | (STATION-1 B-5) | (STATION-1 B-6) |
| | (STATION-2 B-4) | (STATION-2 B-5) |
| (STATION-1 BUS-A) | (STATION-1 B-1) | (STATION-1 B-4) |
| (STATION-1 BUS-B) | (STATION-1 B-3) | (STATION-1 B-6) |
| (STATION-2 BUS-A) | (STATION-2 B-1) | (STATION-2 B-4) |
| (STATION-2 BUS-B) | (STATION-2 B-3) | (STATION-2 B-6) |
| (STATION-1 GEN-1) | (STATION-1 B-1) | (STATION-1 B-2) |
| (STATION-1 GEN-2) | (STATION-1 B-4) | (STATION-1 B-5) |
| (STATION-2 TB1-345KV) | (STATION-2 B-2) | (STATION-2 B-3) |
| (STATION-1 TB2-345KV) | (STATION-2 B-5) | (STATION-2 B-6) |
| (STATION-1 B-1) | (STATION-1 B-2) | (STATION-1 B-4) |
| (STATION-1 B-2) | (STATION-1 B-1) | (STATION-1 B-3) |
| | (STATION-2 B-1) | (STATION-2 B-2) |
| (STATION-1 B-3) | (STATION-1 B-2) | (STATION-1 B-6) |
| | (STATION-2 B-1) | (STATION-2 B-2) |
| (STATION-1 B-4) | (STATION-1 B-1) | (STATION-1 B-5) |
| (STATION-1 B-5) | (STATION-1 B-4) | (STATION-1 B-6) |
| | (STATION-2 B-4) | (STATION-2 B-5) |
| (STATION-1 B-6) | (STATION-1 B-3) | (STATION-1 B-5) |
| | (STATION-2 B-4) | (STATION-2 B-5) |
| (STATION-2 B-1) | (STATION-1 B-2) | (STATION-1 B-3) |
| | (STATION-2 B-2) | (STATION-2 B-4) |
| (STATION-2 B-2) | (STATION-1 B-2) | (STATION-1 B-3) |
| | (STATION-2 B-1) | (STATION-2 B-3) |
| (STATION-2 B-3) | (STATION-2 B-2) | (STATION-2 B-6) |
| (STATION-2 B-4) | (STATION-1 B-5) | (STATION-1 B-6) |
| | (STATION-2 B-1) | (STATION-2 B-5) |
| (STATION-2 B-5) | (STATION-1 B-5) | (STATION-1 B-6) |
| | (STATION-2 B-4) | (STATION-2 B-6) |
| (STATION-2 B-6) | (STATION-2 B-3) | (STATION-2 B-5) |

*Fig. 2* b: BINARY PATTERN n: NEW PATTERN $f = n' + b$ c: CUMULATIVE PATTERN n: NEW PATTERN $f = n' c$

| ELEMENT NAME | BINARY PATTERN | DECIMAL PATTERN |
|---|---|---|
| (STATION-1 STATION-2 L-1) | 100111001111 | -1585 |
| (STATION-1 STATION-2 L-2) | 111100111001 | -199 |
| (STATION-1 BUS-A) | 011011111111 | 1791 |
| (STATION-1 BUS-B) | 111111011011 | -37 |
| (STATION-2 BUS-A) | 110110111111 | -577 |
| (STATION-2 BUS-B) | 111111110110 | -10 |
| (STATION-1 GEN-1) | 001111111111 | 1023 |
| (STATION-1 GEN-2) | 111001111111 | -385 |
| (STATION-2 TB1-345KV) | 111111100111 | -25 |
| (STATION-2 TB2-345KV) | 111111111100 | -4 |
| (STATION-1 B-1) | 101011111111 | -1281 |
| (STATION-1 B-2) | 010111001111 | 1487 |
| (STATION-1 B-3) | 101110001111 | -1137 |
| (STATION-1 B-4) | 011101111111 | 1919 |
| (STATION-1 B-5) | 111010111001 | -327 |
| (STATION-1 B-6) | 110101111001 | -647 |
| (STATION-2 B-1) | 100111101011 | -1557 |
| (STATION-2 B-2) | 100111010111 | -1577 |
| (STATION-2 B-3) | 111111101110 | -18 |
| (STATION-2 B-4) | 111100011101 | -227 |
| (STATION-2 B-5) | 111100111010 | -198 |
| (STATION-2 B-6) | 111111110101 | -11 |

Fig. 4

REAL TIME METHOD FOR PROCESSING ALAARMS GENERATED WITHIN A PREDETERMINED SYSTEM

BACKGROUND OF THE INVENTION

1. Technical field

This invention relates in general to alarm processing, and more particularly, to a diagnostic method for identifying from a set of generated alarms potential faulty components of a predetermined system; such as a power network, in real time.

2. Description of Prior Art

Alarm processing has been a traditional feature of Energy Managment Systems (EMS) and has remained basically unchanged over several generations of EMS designs. Problems with existing diagnostic methods are obvious, and operations personnel have consistently expressed the need for improved methodologies for monitoring the power system network. For example, identified state of the art processing drawbacks include: alarms which are not specific enough; alarms which are too specific; too many alarms occurring during a system disturbance; false alarms; multiplicity of alarms for the same event; and alarms changing too fast to be read on a display. These problems with existing technology are described further in an article entitled "Feasibility Study For An Energy Management System, Intelligent Alarm Processor" by B. F. Wollenberg, IEEE Transactions on Power Systems, Volume PWRS 1, No. 2, (May, 1986).

As a solution, the Wollenberg article proposes an expert system based on the concept that alarms should not be presented to the operator without interpretation. Instead, alarms are analyzed in a real time database of the EMS and only relevant alarms are presented to the operator. The suggested methodology for processing alarms is adjusted according to the state of the system. For example, during a thunderstorm certain alarms are automatically suppressed if they are expected to occur. From a review of the alarm rules and examples presented in the article, it appears that Wollenberg's expert system functions principally as an alarm filter that removes redundant alarms, rather than as a diagnostic system that identifies the faulty, or potentially faulty elements of the system. In addition, as presented, therein the described alarm processor is not, nor can it be interpolated to be, an operational expert system for real time application.

Another expert system for processing alarms in a power network is described in an article entitled, "An Expert System For Fault Section Estimation Using Information From Protective Relays and Circuit Breakers", by C. Fukui and J. Kawakami, IEEE Transactions On Power Delivery, Volume PWRD 1, No. 4 (October, 1986). This expert system estimates possible fault sections using information from protective relays and circuit breakers When a fault occurs, the system makes inferences based on knowledge about protective systems in general and information on the operating relays and tripped circuit breakers The article describes an example of fault estimation in a model network containing several substations, buses, transformers, and circuit breakers However, in a practical power network implementation, an extremely long time can be expected for fault detection using the backward chaining rule-based approach presented.

Another approach to fault diagnosis in a power network has been presented by Komai and Sakaguchi in an article entitled, "Artifical Intelligence Method For Power System Fault Diagnosis", released at the Second International Conference on Power System Monitoring and Control (1986). The Komai and Sakaguchi article descibes an approach different from the rule-based expert systems described above. Their motivation is to solve the problem of incompleteness of the knowledge base, which is an important limitation of present expert systems. According to the authors, expert systems will have the same ability to solve problems as human experts only when human expertise is fully encoded in the knowledge base. Although the approach is powerful in that solutions even under incompleteness and inconsistency of the knowledge base can be obtained, the system is slow. Thus, the approach described therein is inadequate for a real time application.

A review of the literature on available alarm processing techniques demonstrates the present deficiency in the art relating to real time processing of alarm signals in a power network. The present invention is directed to meeting this deficiency.

SUMMARY OF THE INVENTION

Briefly described, the invention comprises methodologies for processing a set of alarms generated by a fault in one or more components of a predetermined system. In a basic form, the method includes the steps of: providing a computer database representative of all components of the system capable of faulting and the interconnections between the components; providing rules that relate component faults to generated alarms and the propagation of component faults within the system; determining individual alarm patterns generated by separate failure of each component within the system using the representative database of components and interconnections and the rules relating component faults to alarms; storing in computer means the individual alarm patterns determined for each component of the system; accomplishing all of the above steps before the set of alarms to be analyzed is generated; and comparing each stored alarm pattern with the generated set of alarms and ascertaining those components whose individual alarm patterns are a subset of the set of alarms, those components being identified as potentially faulted components of the system.

In an enhanced embodiment, the method accomplishes the alarm pattern comparing step in real time and further includes the steps of: hashing each of the individual alarm patterns determined for each system component to a binary pattern corresponding to a unique integer number and storing the resultant binary patterns in the computer means; hashing the set of alarms into a binary representation; and comparing the alarm set binary representation with all binary patterns stored for the system components and ascertaining therefrom all potentially faulted components of the system. Further enhanced processing techniques are also described herein. In addition, a detailed method for processing breaker generated alarms in a power distribution network is provided.

Accordingly, a principal object of the present invention is to provide an improved diagnostic approach to processing alarms in a predetermined system, and more particularly, to such an approach which is capable of being implemented in real time.

Another object of the present invention is to provide an alarm processing method capable of being readily incorporated into a traditional power network, such as a power transmission and distribution system.

Yet another object of the present invention is to provide an expert system capable of assisting an power network operator in analyzing alarms, and thereby facilitate the operator's taking of timely corrective action.

BRIEF DESCRIPTION OF THE DRAWINGS

These and other objects, advantages and features of the present invention will be more readily understood from the following detailed description of certain preferred embodiments of the present invention, when considered in conjunction with the accompanying drawings in which:

FIG. 2 is a table of fault patterns generated pursuant to the present invention using the hypothetical network of FIG. 1;

FIG. 4 is a table of binary patterns produced pursuant to the present invention for the elements in the network of FIG. 1;

DETAILED DESCRIPTION OF THE INVENTION

In a preferred embodiment, the present invention is implemented as an expert system for fault detection in a power network, such as a power distribution system or a power generation system. Generally stated, the present technique is to analyze faults using a hybrid model of rule-based and pattern recognition approaches. The expert system is initially implemented in LOGLISP (i.e., a software product made available marketed by Syracuse University, Syracuse, New York) and is divided into two modes of operation. In a first mode, the system generates a database of the network topology. In the second mode, the system uses this database, and alarms generated by protective breakers dispersed throughout the power network and pattern recognition techniques to identify potential faulty components of the network. With certain refinements described herein, the system can be implemented in real time.

Figure 1:
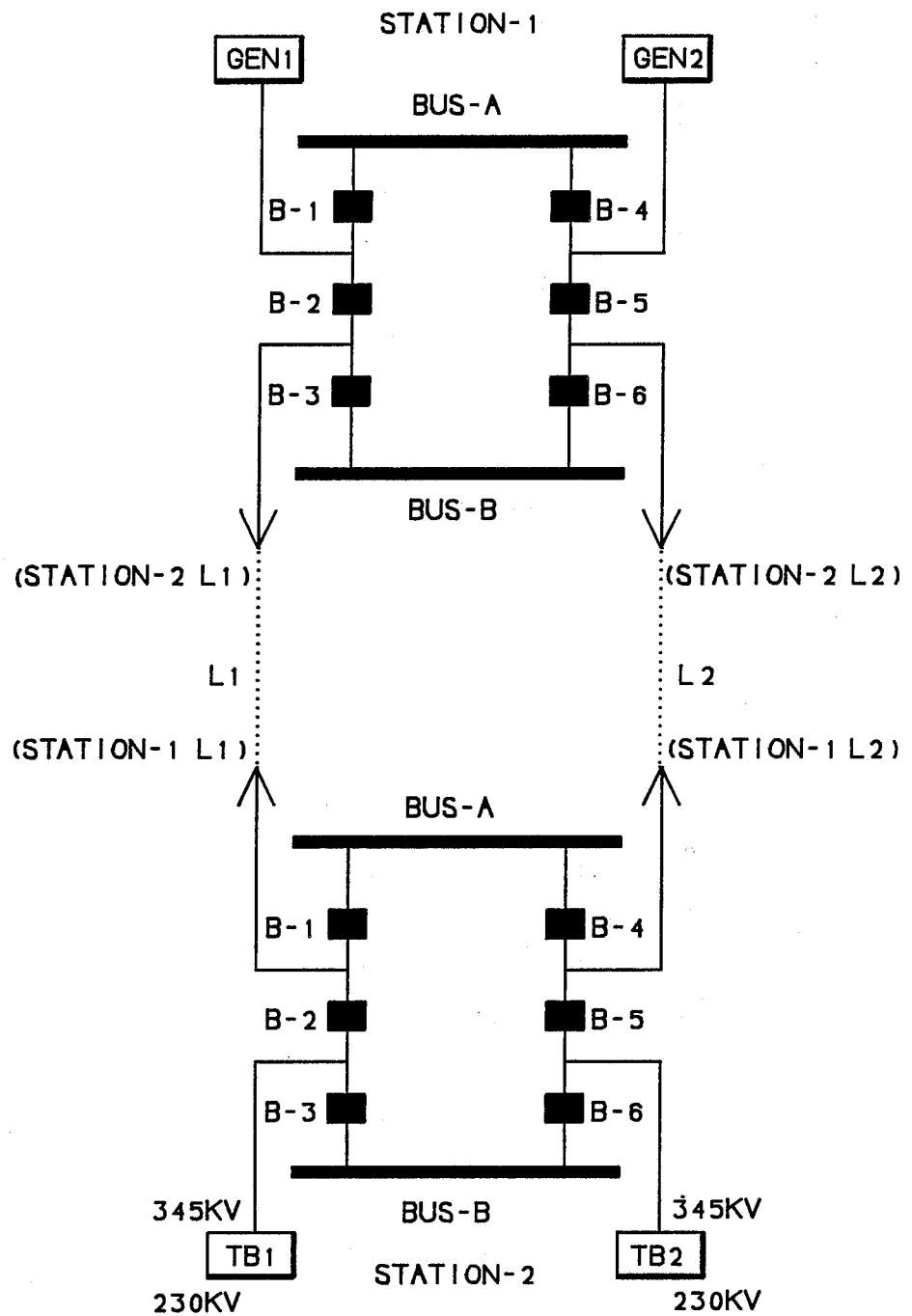
FIG. 1 is a schematic depiction of a hypothetical power network useful in describing the present invention.

A power distribution network consists of stations interconnected by transmission lines. A typical network can be subdivided into sub-networks of different voltages, interconnected by transformer banks. Common sub-network power transmission voltages are 765KV, 345KV, 230KV, and 115KV. Each station in the network is initially represented by a one-line diagram showing its elements (or components), such as generators, tranformers, buses, and breakers, as well as their interconnections. These station diagrams also show the transmission lines that connect one station to its neighboring stations. FIG. 1 shows a hypothetical power network containing only two stations: STATION-1 and STATION-2. STATION-1 contains two generators, two buses and six circuit breakers. STATION-2 contains two transformer banks, two buses and six circuit breakers. Also, two transmission lines interconnect these two stations.

The basic elements in a station are the generators, the transformers, the buses and the transmission lines. (The generators represented in FIG. 1 are in fact generation units that contain a generator and a transformer.) These basic elements are protected by switches and circuit breakers. Switches are elements manually operated to isolate or connect a particular element to the network. Switches are normally used to isolate an element from the power network for maintenance purposes. The switches are omitted from FIG. 1 since they are not used in the present analysis.

Breakers are protective elements of automatic operation that isolate an element from the power network whenever a fault is detected in the network. Associated to each breaker there is a relay that senses the element it protects. Whenever a relay detects an abnormal condition, it sends a signal to open the associated breaker, and generates a message reporting the change in breaker status. In this description, "breaker" will be used to refer to the protective set of elements composed of the breaker itself and the relay associated with the breaker. The message, called an event or an alarm, is displayed on an operator's console at a regional or central control station. Typically, an alarm contains the name of the breaker that changed status, the station, the time of the event, and the new status of the breaker. For example the following message is generated if breaker B-3 in STATION-1 trips:

933.09 STATION-1 B-3 CHANGE IN STATUS DETECTED-OPEN

This alarm reports that at 9h33min3sec, breaker B-3 in STATION-1 has opened.

When a fault occurs in the system, several protection breakers typically trip and are reported to the operator. The operator must then determine the fault that caused the breakers to trip. In a heavy thunderstorm or in major system malfunctions, a large number of breaker alarms may occur, making it very difficult for the operator to determine the severity of the situation and to interpret all the alarms. These situations are often very critical and may require fast intervention by the operator. Nevertheless, it may be difficult for the operator to act correctly due to an information overflow of alarm signals. In this context, an expert system that can interpret the incoming alarms rapidly and provide the operator with a more informative network system assessment would obviously be very useful. Such an expert system would not replace the operator, but rather act as an intelligent assistant in fault diagnosis and decision making.

An expert system approach to alarms processing requires a logical representation of the power network. The power network should be described in a way that a computer program could easily extract information about the network, such as the connectivity of each element, and lists containing element names.

Applicant has decided to represent the network by assertions of facts in a text file. This file contains the inforamtion about the connectivity of all elements in the network, obtained from the one-line diagrams of each station. The generation of this file can be done manually using a text editor. An expert system accesses this file whenever it needs information about the network. The convenience of using this approach is that the file containing the network description can be easily updated whenever there is a change in the network topology.

Each assertion in the connectivity file is a list describing an element, and has the following format:

(<element-type> <station-names>
  <element-id> <connections>)

<element-type>: Can be a Breaker, Bus, Generator, or Transformer.

<station-name>: The name of the station where the element is located.

<element-id>: The identification of the element within that station. The identification of breakers, buses and generators are the same ones used in the one-line diagrams. Nevertheless, the identification of transformer banks is slightly different. A transformer bank is considered as two elements representing the primary and the secondary of the transformer. The identification of each of these elements is the same one used in the diagrams, and contains the typical voltage at the output of this element. By representing a transformer bank in this way, it is possible to detect faults occurring in only one of its windings.

<connections>: Contain the identifications of all elements connected to the element being described.

Below are several examples of assertions describing the connectivity of some elements in the hypothetical power network present of FIG. 1:

(Breaker, STATION-2, B-5, TB2-345KV, (STATION-1 L2))
(Bus, STATION-1, BUS-B, B-3, B-6)
(Generator, STATION-1, GEN1, B-1, B-2)
(Transformer, STATION-2, TB1-345KV, B-3, B-2)

The first example states that breaker B-5 in STATION-2 connects the 345KV side of transformer TB2 in this station to transmission line L2 that connects STATION-1 to STATION-2. The second example states that BUS-B in STATION-1 has breakers B-3 and B-6 connected to it. The third example states that generator GEN1 in STATION-1 has breakers B-1 and B-2 connected to it. The last example states that the 345KV side of the transformer TB-1 in STATION-2 has breakers B-2 and B-3 connected to it.

Although an element can be explicitly represented with an assertion, it is not always necessary to represent all elements in this way. In a power network where all system components are connected to circuit breakers, such as the hypothetical network represented in FIG. 1, applicant has discovered that it is only necessary to represent the breaker type elements explicitly. The other elements will be implicitly represented by the assertions. An expert system can ascertain the information about the connectivity of these elements by simple manipulations on the assertions. In this way, the following assertions comprise the connectivity file and completely describe the power network presented in FIG. 1:

(Breaker, STATION-1, B-1, BUS-A, GEN1)
(Breaker, STATION-1, B-2, GEN1, (STATION-2 L1))
(Breaker, STATION-1, B-3, (STATION-2 L1), BUS-B)
(Breaker, STATION-1, B-4, BUS-A, GEN2)
(Breaker, STATION-1, B-5, GEN2, (STATION-2 L2))
(Breaker, STATION-1, B-6, (STATION-2 L2) BUS-B)
(Breaker, STATION-2, B-1, BUS-A, (STATION-1 L1))
(Breaker, STATION-2, B-2, (STATION-1 L1), TB1-345KV)
(Breaker, STATION-2, B-3, TB1-345KV, BUS-B)
(Breaker, STATION-2, B-4, BUS-A, (STATION-1 L2)
(Breaker, STATION-2, B-5, (STATION-1 L2) TB2-345KV)
(Breaker, STATION-2, B-6, TB2-345KV, BUS-B)

Although all elements have their own idenification within the station, they are not completely identified in the system since it is possible to have different elements of the same type, with the same identification, but in different stations. Also, although not shown in the hypothetical network of FIG. 1, the identification of a transmission line could be used to identify lines that connect different stations in the network.

To completely identify an element in the system, a pair is formed with the name of the station where it is located and its identification within the station. Some examples are shown below:

(STATION-1 B-1): a breaker located in STATION-1;

(STATION-2 BUS-B): a bus located in STATION-2;

(STATION-1 GEN1): a generator located in STATION-1;

(STATION-2 TB1-345KV): One side of a transformer located in STATION-2;

(STATION-2 STATION-2 L1): a transmission line that connects STATION-1 and STATION-2.

A process for extracting additional information about the network, such as lists containing the names of the elements, from the connectivity file will now be presented.

If a list is created with the names in the station-name field of all assertions, and removing duplicate names, a set, or a list is obtained containing the names of all stations in the system. Such a list is called STATION-LIST and considering the assertions of the hypothetical network, it is defined as:

STATION-LIST = (STATION-1, STATION-2)

From a list formed by the concatenation of the names contained in the station-name field and the id-field of all assertions, a list of all breakers in the system is obtained. Such a list is called BREAKER-LIST and considering the assertions previously described, it comprises:

```
BREAKER-LIST = ((STATION-1 B-1), (STATION-1 B-2),
                (STATION-1 B-3), (STATION-1 B-4),
                (STATION-1 B-5), (STATION-1 B-6),
                (STATION-2 B-1), (STATION-2 B-2),
                (STATION-2 B-3), (STATION-2 B-4),
                (STATION-2 B-5), (STATION-2 B-6))
```

Similarly, from a list formed by the concatenation of the name in the station-name field and the names in the connection field that are not transmission lines, a list of all generators, buses and transformers, is obtained, i.e., assuming the names in these fields contain the patterns GEN, BUS or TB. Duplicate elements are removed after this operation. Using as an example the above assertions, the following lists are obtained:

GEN-LIST =((STATION-1 GEN1), (STATION-2 GEN2))

BUS-LIST =((STATION-1 BUS-A), (STATION-1 BUS-B), (STATION-2 BUS-A), (STATION-2 BUS-B))

TB-LIST =((STATION-2 TB1-345KV), (STATION-2 TB2-345KV))

A list containing the names of all transmission lines in the system can also be created. Each element of this list is obtained by concatenating the station name in one assertion with the names in the connection field, provided that these names represent a transmission line (the identification is in parenthesis). Each element is built in such a way that after the concatenation, the names appear in alphabetical order. After removing the duplicates, a list of all transmission lines in the system (called LINE-LIST) is obtained, which in the presented example is defined as:

LINE-LIST =((STATION-1 STATION-2 L1), (STATION-1 STATION-2 L2))

All of these lists can be easily built by those skilled in the art using languages able to do symbolic manipulation, and that also have special query instructions that perform some operations of relational algebra.

The next step after representing the network is to define a series of rules that relate component faults to generated alarms and to the propagation of component faults within the system. The following rules describing the behavior of the circuit breakers and the nature of a complex fault have been formulated:

Rule 1. A fault in a transmission line trips all breakers connected to that line;

Rule 2. A fault in a transformer bank trips all breakers connected to that transformer;

Rule 3. A bus fault trips all breakers connected to that bus;

Rule 4. A generator fault trips all breakers connected to that generator;

Rule 5. If a fault occurs in a bus, generator, transformer bank or transmission line with a faulty breaker (stuck breaker) connected to this element, then the fault propagates through the faulty breaker to the other elements connected to it, tripping other breakers according to the rules previously described;

Rule 6. If a faulty breaker is detected through the analysis of alarms, then a fault must have occurred in at least one of the elements connected to this breaker, and those elements must be reported as potential faulty elements; and Rule 7. A complex fault occurring in the network can always be decomposed into single faults occurring in different elements of they system.

As examples of application, if rule 4 is applied to one of the generators in the hypothetical power network shown in FIG. 1, then a:

Fault in (STATION-1 GEN1)

Trips breakers (STATION-1 B-1) and (STATION-1 B-2)

The application of rules 5 and 6 to the hypothetical network is illustrated as follows:

If the breakers (STATION-1 B-1), (STATION-1, B-3) (STATION-2 B-1) and (STATION-2 B-2) trip, then it can be concluded by rules 5 and 6, that a fault occurred in the generator (STATION-1 GEN1) or transmission line (STATION-1 STATION-2 L1), and breaker (STATION-1 B-2) failed to trip.

Rule 7 says that a complex fault is always formed by a combination of single faults. This means that if a set of alarms is generated, then all of its subsets must be identified, each one representing the alarms for a single fault in the network.

Applying rules 3 and 7 to the hypothetical power network, produces:

Breakers tripped: (STATION-1 B-1), (STATION-1 B-2), (STATION-1 B-4) and (STATION-1 B-6)

Fault in: (STATION-1 BUS-1) and (STATION-1 BUS-2)

From the nature of the rules presented, the rules can be divided into two groups: the first dealing with the generation of fault patterns (rules 1 to 5), and the second with the process of matching fault patterns with alarms (rules 6 and 7). In fact, as noted initially, this methodology uses two different techniques in its analysis: the rule-based and the pattern recognition approaches.

An expert system based on this methodology must first determine all the elements in the power network from their representation in the connectivity file. Then, it must determine the fault pattern for each element. This process is done by using the information in the connectivity file and the rules describing the behavior of breakers and the propagation of faults (rules 1 to 5). The fault pattern associated with an element in the network is defined as the set containing the names of all breakers that trip if a fault occurs in that element. Finally, the pattern recognition approach and the rule of multiple faults (rules 6 and 7) are used to determine the potential faulty elements in the network that explain the particular set of incoming alarms. The possible fault patterns for the hypothetical network of FIG. 1 are set forth in FIG. 2. Note that the number of fault patterns is always equal to the total number of elements in the power network.

Once the fault patterns are generated, the process of finding faults in the network can be accomplished by comparing each fault pattern with the set of alarms to be analyzed. Those elements whose fault pattern is a subset of the set of alarms are considered potential faulty elements. A list containing these elements must be checked in order to find the existence of breakers. Breakers in this list that are also reported by the alarms as tripping breakers cannot be considered as stuck or faulty breakers and must be removed from the list. Rule 7 is then applied to all other breakers. This process is illustrated in the following example.

Assume that alarms have been received reporting that the following breakers have tripped:

(STATION-1 B-1), (STATION-1 B-2), (STATION-1 B-3), (STATION-2 B-1) and (STATION-2 B-2)

By comparing the fault pattern of each element with the alarms received, and finding the elements whose fault pattern is a subset of the received alarms the following list of potential faulty elements is obtained:

(STATION-1 STATION-2 L1), (STATION-1 GEN1) and (STATION-1 B2)

Although breaker (STATION-1 B-2) was reported as a potential faulty element, it cannot be considered as a stuck breaker, since there is also an alarm reporting that it has tripped. Thus, the final solution of the analysis is that faults are likely to have occurred in:

transmission line (STATION-1 STATION-2 L1) and
generator (STATION-1 GEN1)

The process of finding breaker faults can also be illustrated by an example. Again, assume that the following alarms have been received:

(STATION-1 B-1) and (STATION-1 B-5)

By comparing the fault patterns with the alarms received, it can be concluded that the breaker (STATION-1 B-4) is the only one whose fault pattern is a subset of the alarms received. Since there is no alarm reporting that this breaker has tripped, it can be considered as a faulty element and, according to rule 7, the elements connected to are also reported as faulted elements. Thus, the final result is that faults may have occurred in elements:

breaker (STATION-1 B-4), generator (STATION-1
GEN-1) and bus (STATION-1 BUS-A)

With this methodology of alarms analysis, it is also possible to detect isolated breaker trips and telemetering error. The breakers in the set of received alarms that do not belong to the set with the fault patterns are considered as isolated trip or telemetering errors. This process is illustrated in the following example.

Assume that the following alarms, reporting tripping breakers are received:

(STATION-1 B-1), (STATION-1 B-4) and
(STATION-2 B-3)

After the matching process, a fault is identified as occurring in:

(STATION-1 BUS-A)

and its fault pattern is:

(STATION-1 B-1), (STATION-1 B-4)

Comparing the breakers in this fault pattern with the set of alarms, it will be observed that the breaker (STATION-2 B-3) does not belong to the set of fault patterns. Thus it is reported as an isolated trip or a telemetering error. A specific implementation of an expert system for alarms processing, using the concepts discussed above, will now be presented. First, however, the choice of programming language is an important aspect to be considered in expert system design. Characteristics to look for in choosing a system language include: efficiency of code generated, capabilty of expressing relationships, symbolic manipulation, mechanisms for interfacing with other systems and fast prototyping. Three such systems described below are LISP, PROLOG, and LOGLISP.

LISP and PROLOG are popular languages for expert system design and are described in the literature. LISP is a functional programming language (i.e., a function takes input arguments and computes results) designed for symbolic manipulation. It works directly with symbols, instead of assigning values to the symbols and operating with the values as with procedural languages. Symbolic manipulation is an important characteristic since it allows the emulation of some steps in human reasoning. PROLOG is a language based on first order predicate calculus. A program in PROLOG consists of facts and rules. Two types of queries are allowed, depending upon whether or not the variables are instantiated (have value) or not. In queries with instantiated variables, a search is performed through the facts and rules, and returns a true or false answer to the query is returned. The second type of query returns an object that matches the query. This mechanism is typically called pattern matching.

An ideal language for expert systems development is one combining both the functional characteristics of LISP and the logic characteristics of PROLOG. LOGLISP embodies such a language. Several articles have been published describing LOGLISP, including: J.A. Robinson and E.E. Sibert "LOGLISP: An Alternative to PROLOG", Machine Intelligence, Ellis Howood Ltd., Chichester, England (1982); J.A. Robinson and E.E. Sibert "LOGLISP: Motivation, Design and Implementation", Logic Programming, APIC Studies in Data Processing, No. 16, Academic Press (1982); and J.A. Robinson, E.E. Sibert, D.W. RAha "The LOGLISP programming system, LISP/VM Version" (VM-VM3M1), Syracuse University, Syracuse, New York (1984). LOGLISP is an implementation of LOGIC programming in a LISP environment. It consists of LISP with a set of logic programming primitives referred to as LOGIC.

LOGLISP programming language is selected for the expert system since it is believed to be the most suitable language for this application. The ability to perform symbolic manipulation with LISP permits set operations such as unions and differences, while the availability of LOGIC functions, such as assertions and queries, allows the performance of inferences using both forward and backward chaining. These two characteristics of LOGLISP make it possible to describe power networks and encode the rules used in this expert system.

Figure 3:
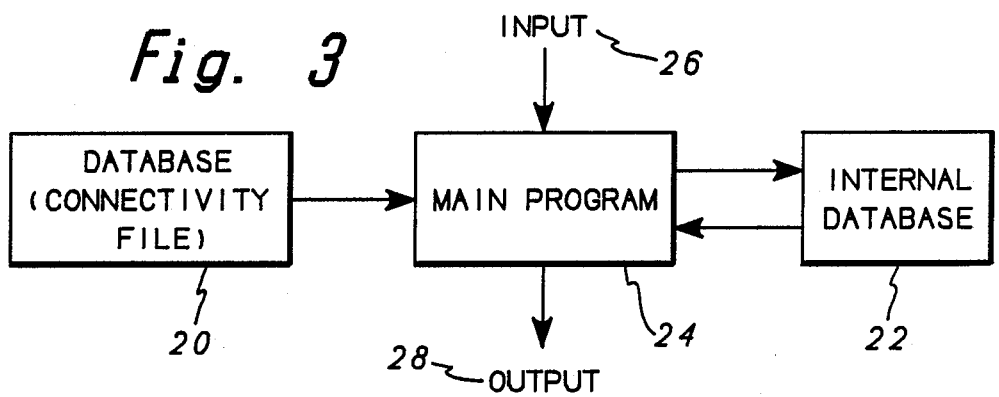
FIG. 3 is a block diagram representation of an expert alarm system incorporating the present invention.

FIG. 3 represents a block diagram implementation of an expert alarm system incorporating the present invention. The system includes a database 20, internal database 22, main program 24, and input 26 and output 28. Database 20 comprises a file of LOGLISP assertions describing the power network topology (discussed above) and is automatically loaded with the expert system environment.

As described further below, internal database 22 contains a set of working lists generated by the main program from the connectivity file. Main proram 24 consists of a set of LOGLISP functions, embodying the present invention, to analyze alarms, determine causes, and present faults to the user. The input 26 consists of a set of time coincident breaker alarms, and the output 28 consists of a sufficient set of potential faulty elements that explains the occurrence of the alarms generated.

As noted, internal database 22 consists of a set of lists generated from the connectivity file 20 that are used by the expert system in its analysis. These lists are:

STATION-LIST: contains the names of all stations;
BREAKER-LIST: contains the name of all breakers;
LINE-LIST: contains the names of all transmission lines;
BUS-LIST: contains the names of all generators;
GEN-LIST: contains the names of all generators
TB-LIST: contains the names of all transformer banks;

FAULT-LIST: contains the name of all elements in the system;

PATTERN-LIST: contains the fault pattern for each element in the system. A fault pattern is a list containing breaker names.

Once built, these lists are stored in a file which is automatically read whenever the expert system environment is loaded. The internal database is only updated if the power network topology changes. The internal database for the hypothetical power network shown in FIG. 1 includes:

---

STATION-LIST =
(STATION-1 STATION-2)
BREAKER-LIST =
((STATION-1 B-1) (STATION-1 B-2) (STATION-1 B-3)
 (STATION-1 B-4) (STATION-1 B-5) (STATION-1 B-6)
 (STATION-2 B-1) (STATION-2 B-2) (STATION-2 B-3)
 (STATION-2 B-4) (STATION-2 B-5) (STATION-2 B-6)
LINE-LIST =
((STATION-1 STATION-2 L1) (STATION-1 STATION-2 L2))
BUS-LIST =
((STATION-1 BUS-A) (STATION-2 BUS-A)
 (STATION-1 BUS-B) (STATION-2 BUS-B)
GEN-LIST =
((STATION-1 GEN-1) (STATION-1 GEN-2))
TB-LIST =
((STATION-2 TB1-345KV) (STATION-2 TB2-345KV))
FAULT-LIST =
((STATION-1 STATION-2 L1) (STATION-1 STATION-2 L2)
 (STATION-1 BUS-A) (STATION-2 BUS-A) (STATION-1 BUS-B)
 (STATION-2 BUS-B) (STATION-1 GEN-1) (STATION-1 GEN-2)
 (STATION-2 TB1-345KV) (STATION-2 TB2-345KV)
 (STATION-1 B-1) (STATION-1 B-2) (STATION-1 B-3)
 (STATION-1 B-4) (STATION-1 B-5) (STATION-1 B-6)
 (STATION-2 B-1) (STATION-2 B-2) (STATION-2 B-3)
 (STATION-2 B-4) (STATION-2 B-5) (STATION-2 B-6))
TRIP-LIST =
((STATION-1 BUS-A) (STATION-1 GEN-1)
 (STATION-1 GEN-1) (STATION-1 STATION-2 L1)
 (STATION-1 STATION-2 L1) (STATION-1 BUS-B)
 (STATION-1 BUS-A) (STATION-1 GEN-2)
 (STATION-1 GEN-2) (STATION-1 STATION-2 L2)
 (STATION-1 STATION-2 L2) (STATION-1 BUS-B)
 (STATION-2 BUS-A) (STATION-1 STATION-2 L1)
 (STATION-1 STATION-2 L1) (STATION-2 TB1-345KV)
 (STATION-2 TB1-345KV) (STATION-2 BUS-B)
 (STATION-2 US-A) (STATION-1 STATION-2 L2)
 (STATION-1 STATION-2 L2) (STATION-2 TB2-345KV)
 (STATION-2 TB2345KV) (STATION-2 BUS-B))
PATTERN-LIST =
(((STATION-1 B-3) (STATION-1 B-2) (STATION-2 B-2)
 (STATION-2 B-1))
 ((STATION-1 B-6) (STATION-1 B-5) (STATION-2 B-5)
 (STATION-2 B-4))
 ((STATION-1 B-1) (STATION-1 B-4))
 ((STATION-2 B-1) (STATION-2 B-4))
 ((STATION-1 B-3) (STATION-1 B-6))
 ((STATION-2 B-3) (STATION-2 B-6))
 ((STATION-1 B-2) (STATION-1 B-1))
 ((STATION-1 B-5) (STATION-1 B-4))
 ((STATION-2 B-3) (STATION-2 B-2))
 ((STATION-2 B-6) (STATION-2 B-5))
 ((STATION-1 B-4) (STATION-1 B-2))
 ((STATION-1 B-1) (STATION-1 B-3) (STATION-2 B-2)
 (STATION-2 B-1))
 ((STATION-1 B-2) (STATION-1 B-2) (STATION-2 B-1)
 (STATION-2 B-6))
 ((STATION-1 B-1) (STATION-1 B-5))
 ((STATION-1 B-4) (STATION-1 B-6) (STATION-2 B-5)
 (STATION-2 B-4))
 ((STATION-1 B-5) (STATION-2 B-5) (STATION-2 B-4)
 (STATION-1 B-3))
 ((STATION-2 B-4) (STATION-1 B-3) (STATION-1 B-2)
 (STATION-2 B-2))
 ((STATION-1 B-3) (STATION-1 B-2) (STATION-2 B-1)

---continued (STATION-2 B-3))
 ((STATION-2 B-2) (STATION-2 B-6))
 ((STATION-2 B-1) (STATION-2 B-6) (STATION-1 B-5)
 (STATION- B-5))
 ((STATION-1 B-6) (STATION-1 B-5) (STATION-2 B-4)
 (STATION-2 B-6))
 ((STATION-2 B-5) (STATION-2 B-3)))

---

In addition to these lists, there are some temporary lists that are used during the expert system execution. These lists are:

CUMULATIVE-LIST:

List containing the breaker names in the fault pattern of each element considered as a potential faulty element;

RESULT-LIST:

List containing the names of the potential faulty elements found during an analysis;

TELE-LIST:

List containing the name of tripping breakers that are not related to any fault in the system;

UNKNOWN-LIST:

List containing the breaker names given to the expert system, but that are not recognized.

A process for building the lists belonging to the internal database will be described next. Initially, three lists are geneated from the connectivity file: STATION-LIST, BREAKER-LIST and NON-BREAKER-LIST.

STATION-LIST is created by the LOGLISP instruction:

(SETQ STATION-LIST (SORT (ALL s (Breaker s ###))))

This instruction is executed in three steps. In the first one, the query:

(ALL s (Breaker s ###))

builds a temporary list containing all the names in the first field of each assertion describing a breaker-type element in the connectivity file. They symbol # means that the query must ignore the names in the fields containing this symbol. Duplicate names are automatically removed by this instruction. The second step sorts the names in the temporary list, and the third step assigns its contents to STATION-LIST.

BREAKER-LIST is generated by the LOGLISP instruction:

(SETQ BREAKER-LIST (ALL (s x) (Breaker s x ##)))

In the first step of this instruction, the command (ALL (s x) (breaker s ×##))

builds a temporary list whose elements are also lists. Each element contains the names in the first and second fileds (denoted by s and x in the query) of an assertion describing a breaker-type element in the connectivity file. In the second step of this instruction, the contents of the temporary list are assignd to BREAKER-LIST.

NON-BREAKER-LIST is an auxiliary list containing the names of all elements that are not breakers. It is generated by the instruction:

```
(SETQ NON-BREAKER-LIST
 (UNION (ALL (s x) (Breaker s ## x))
        (ALL (s x) (Breaker s # x #))))
```

This instruction has two queries. In the first one, a temporary list with elements containing the names in the first and fourth fields of the assertions in the connectivity file are created. The second query creates a similar list with the names in the first and third fields. The two lists are merged into a single list and duplicated names are automatically removed. The resulting list is assigned to NON-BREAKER-LIST.

LINE-LIST, BUS-LIST, TB-LIST and GEN-LIST are built by a LISP that analyzes each element of NON-BREAKER-LIST, and puts it in the appropriate list.

FAULT-LIST, as defined before, contains the names of all elements in the system. It is generated by a LISP function that concatenates LINE-LIST, BUS-LIST, GEN-LIST, TB-LIST and BREAKER-LIST, and then assigns this temporary list to FAULT-LIST.

PATTERN-LIST contains the fault pattern of each element in the system. Each element of this list is a list containing the breaker names associated to a fault in a particular element. The elements in PATTERN-LIST are generated by LOGLISP functions that implement the rules described above. All of these functions are presented in more detail in the Appendix attached hereto and incorporated herein.

The main program 24 comprises two files containing LISP and LOGLISP functions for data manipulation and queries. These functions are set forth in the Appendix. Of these, four functions are available to the user. These functions, with examples of their usage, are presented below.

GENERATE-DATABASE: This function builds the internal database using the assertions in the connectivity file. It does not receive any parameter. At the end of its execution, it saves the internal database in a file called ALEX.DB. This function is called just by entering the command (GENERATE-DATABASE)

while in the expert system environment.

FAULT: Returns the list of breakers that trip if a fault occurs in the element passed as parameter. The element can be a transmission line, a bus, a transformer, a generator, or a breaker.

```
Ex. (FAULT '(STATION-1 STATION-2 L1))
    (FAULT '(STATION-1 BUS-A))
    (FAULT '(STATION-1 GEN-1))
    (FAULT '(STATION-2 TB1-345KV))
    (FAULT '(STATION-2 B-1))
```

TRIP: Returns the elements connected to the breaker whose name is passed as parameter.

Ex. (TRIP '(STATION-1 B-1))

SEARCH: Finds the possible faulty elements in the power network that would explain the behavior of the tripping breakers passed as parameters. This function returns:
the possible faulty elements in the system, if any;
the tripping breakers not related to any fault, if any;
the breakers received as parameters that are unknown to the expert system, if any.

The functions are the direct representation of the rules presented above. Examples of these functions are LINE-FAULT (rule #1), BUS-FAULT (rule #3), and BREAKER-FAULT (rule #6). For purposes of illustration, the function BUS-FAULT is described in detail. Its body is shown below:

```
(BUS-FAULT
 (LAMBDA (BUS)
  (ALL (s b)
   (OR (Breaker s b y #) (Breaker s b # y))
   (= s (CAR BUS))
   (= y (LAST BUS)))))
```

This function receives a list (BUS) containing a bus name (station name and bus id). The query in this function finds a list whose elements are also lists, but containing only two names. These names are contained in the first and second fields of an assertion in the connectivity file that has in the first field the station name where the bus is located, and in the third or fourth fields the bus id. Duplicate names are automatically removed, and the function returns to the caller a list containing all the breakers connected to the bus. These breakers trip if a fault occurs in this bus. The functions representing other rules are presented in the Appendix to this work.

An important aspect of any software for real time application is its ability to analyze incoming data in a short period of time. Experiments with the processing technique described herein have demonstrated that in a multiuser environment response time may be on the order of several minutes, which is not acceptable for real time applications. Some modifications are thus necessary to improve the performance of the expert system.

The system SEARCH function searches for faulty elements from a set of tripped breakers. The process of finding faulty elements consists basically of a sequential search in PATTERN-LIST to find fault patterns that are subsets of the set of tripped breakers received as parameters. The 'subset' operation tends to be time consuming since each breaker name in a particular fault pattern must be compared with the breaker names in te set of tripped breakers. One solution to speed up the search process is to represent each fault pattern with a unique integer number. This mapping function is referred to as hashing. In this way the 'subset' operation deals with numbers instead of strings, resulting in a faster process. Implementation of this function in the present invention will now be described.

Each fault pattern is mapped into an integer number containing a number of bits equal to the total number of breakers in the power network. Each bit in this number corressponds to a breaker in BREAKER-LIST. An open breaker in a particular fault pattern is represented with the value "0" in the corresponding bit of the integer number. The bits associated with the breakers that are not in this fault pattern are represented as "1". The following example illustrates the process.

Consider the transmission line (STATION-1 STATION-2 L1) in the hypothetical power network of FIG. 1. According to the table of FIG. 2, this line has the following fault pattern:

(STATION-1 B-2, STATION-1 B-3, STATION-2 B-1, STATION-2 B-2)

According to the mapping rules previously defined, the new fault pattern representation is 100111001111, which corresponds to the number −1585 in the two's complement notation.

The fault pattern representation described above is called a binary pattern. In this representation, a fault pattern contains the status of all breakers in the power network, assuming that ony one fault has occurred. FIG. 4 shows the binary pattern produced from faulting of each element in the hypothetical power network of FIG. 1. A set of breaker alarms is hashed in the same way into a binary representation. This pattern is then compared with all binary patterns in the database to find the subsets. The binary representation of a set of alarms is called NEW-PATTERN.

A binary pattern is considered a subset of NEW-PATTERN if all bits with value "0" in this pattern have a corresponding bit with value "0" in NEW-PATTERN. As an example, consider the following open breakers:

(STATION-1 B-1), (STATION-1 B-4),
(STATION-2 B-3) and (STATION-2 B-6)

The binary representation associated with these breakers is:

NEW-PATTERN =011011110110

Comparing all the binary patterns shown in FIG. 4 with NEW-PATTERN, one can conclude that the patterns associated with elements (STATION-1 BUS-A) and (STATION-2 BUS-B) are subsets of NEW PATTERN since all bits representing open breakers have a corresponding representation in NEW-PATTERN. Thus, elements (STATION-1 BUS-A) and (STATION-2 BUS-B) are considered as possible faulty elements.

Figure 5:
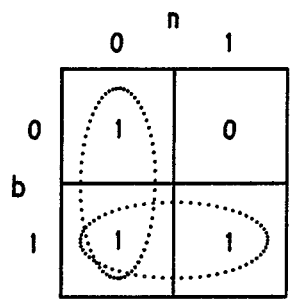
FIG. 5 is a Karnaugh map useful in describing the pattern matching implemented by one embodiment of the present invention.

This rule for subset testing is easily represented by the boolean function derived from the Karnaugh map shown in FIG. 5. Thus, the pattern matching (or "subset" operation) is done by complementing all bits in NEW-PATTERN, and performing a bitwise OR operation with the binary patterns for all elements in the network. The elements whose binary patterns result in a number containing all bits equal to "1" after the matching process, are considered potential faulty elements. If a potential faulty element is a breaker, additional steps are taken as described above to determine if a stuck breaker situation exists.

The process of finding breaker trips with no fault, such as telemetering error, is also possible with this binary representation of fault patterns. Initially, a bitwise AND operation is performed among all binary patterns associated with the potential faulty elements. This resulting pattern, called CUMULATIVE-PATTERN, is then compared with NEW-PATTERN. Those bits in NEW-PATTERN hashing a pattern of open breakers that do not have an equivalent representation in CUMULATIVE-PATTERN represent isolated breakers that tripped with no fault associated with them. As an example, consider the following tripped breakers:

(STATION-1 B-1), (STATION-1 B-2),
(STATION-1 B-4) and (STATION-2 B-6)

The binary pattern for these breakers is:

NEW-PATTERN =001011111110

Comparing this pattern with all binary patterns in FIG. 4, the following potential faulty elements are obtained:

(STATION-1 BUS-A), (STATION-1 GEN-1) and
(STATION-1 B-1)

Breaker (STATION-1 B-1) cannot be considered as a stuck breaker, however, since it was also reported as an open breaker. Thus the faulty elements are (STATION-1 BUS-A) and (STATION-1 GEN-1).

According to FIG. 4, the binary pattern associated with these faulty elelments are 011011111111 and 001111111111, respectively. CUMULATIVE-PATTERN is then represented as:

CUMULATIVE-PATTERN =(011011111111)
AND (001111111111) =001011111111

Figure 6:
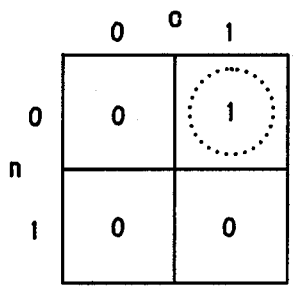
FIG. 6 is a Karnaugh map useful in describing a technique for identifying improperly faulted network breakers pursuant to one embodiment of the present invention.

Comparing NEW-PATTERN with CUMULATIVE-PATTERN, we can see that its rightmost bit is "0" but its corresponding bit in CUMULATIVE-PATTERN is not. The breaker in BREAKER-LIST corresponding to this bit, (STATION-2 B-6) in this case, is then reported as having tripped with no fault associated with the event. The boolean operation to find these breakers is derived from the Karnaugh map shown in FIG. 6.

In the above example, this operation produces:

f =$\overline{001011111110}$ AND 001011111111
 =000000000001

Since the rightmost bit is equal to "1", the last breaker in BREAKER-LIST, in this case (STATION-1 B-6), must have tripped with no fault associated with it.

The above described approach for optimal execution of the present invention cannot be implemented in LOGLISP or LISP, since these languages do not readily support bit manipulation functions. The approach results in optimal execution only if its implemented in a typed language that supports bit operations, such as C or PASCAL.

The SEARCH function, described above, analyzes breaker alarms and presents solutions. This function, using the modified pattern representation, can be easily translated into a typed language since it uses standard functions. The only function that uses LOGIC is the TRIP function that finds the elements connected to a particular breaker.

To implement the SEARCH function in a typed language, two more lists are generated by the LOGLISP implementation of the expert system processor, and stored in its internal database. These lists are BINARY-LIST and TRIP-LIST.

BINARY-LIST contains the binary pattern of all the elements in the power network. Each binary pattern is a list of 1's and 0's, representing the breaker status for each fault. The first element represents the status of the first breaker in BREAKER-LIST, the second element represents the second breaker, and so on. Three functions are used for hashing the fault patterns in PATTERN-LIST into their binary representation: GENERATE-BINARY, MAP-PATTERN and FIND-INDEX. These functions are shown in the Appendix.

TRIP-LIST contains the names of the elements connected to the corresponding breaker in BREAKER-LIST. This list is read during program initialization, and is accessed to identify the names of the elements connected to a particular breaker. In this way, the program does not need to query the database containing the network representation. TRIP-LIST can also be used by the LOGLISP version of the expert system to improve its performance. This list is read during the initialization process of the expert system, and kept in a hash table. The search function then accesses this table instead of the TRIP function to determine which elements connect to a given breaker. The performance of the SEARCH function improves by using a hash table as a fast access data structure, and by replacing the TRIP function interpreted in LOGLISP.

As already noted, the internal database of the expert alarm processor consists of a text file containing such lists as STATION-LIST, LINE-LIST, PATTERN-LIST, etc. Although this is a text file, it would be very difficult for a program written in a language other than LISP to use this database. When the database is generated, each of its lists is divided into records of 80 characters. Each record is then stored as one line in a file. To solve this problem, it is necessary to write a program that translates the database generated by the LOGLISP program into a format acceptable to a program written in PASCAL or C. This conversion program, called CONVALEX, is itself written in PASCAL and is set forth in the Appendix. CONVALEX is basically composed by two functions called CONVERT-LIST and CONVERT-PATTERN. The CONVERT-LIST function converts the lists containing names and the CONVERT-PATTERN converts the list containing the binary fault patterns (BINARY-LIST).

The rules used by CONVALEX in the conversion of the database are:

1. Each element of STATION-LIST in the original database is written in one line of the new database. In the representation of our hypothetical power network, the list (STATION-LIST =(STATION-1 STATION-2)

is translated as:

STATION-1

STATION-2

2. Each element of LINE-LIST in the original database is written in one line of the new database, with parentheses removed. For example:

LINE-LIST =((STATION-1 STATION-2 L1)
(STATION-1 STATION-2 L2))

is translated into:

STATION-1 STATION-2 L1

STATION-1 STATION-2 L2

3. The previous rule also applies to other lists in the original database, such as BUS-LIST, TB LIST, GEN-LIST, BREAKER-LIST, FAULT-LIST and
TRIP-LIST.

4. Each element of BINARY-LIST is broken in groups of 1's and 0's. The size of a group equals the integer word-length in the computer, which in a preferred implementation is 32 bits, for example for the IBM 3090. Each group of 32 bits is represented as a 32-bit integer number. Each number is written on one line of the new database in its decimal representaiton in 2's complement. Dummy 1's are appended to the representation, to make each entry a multiple of 32.

As an example, the binary pattern
(111100111001)

is represented in an 8-bit computer as two 8-bit binary numbers: 11110011 and 10011111. These numbers are stored in the new database as −13 and −97 respectively.

In the process of recoding the LOGLISP database, the conversion program uses the parentheses in each list as delimiters to find the number of elements in each list. This information is passed to the optimized version of the function SEARCH by writing it to the file containing its source code. This process is described in more detail below.

The translated version of the database for the hypothetical network is presented in the Appendix. Note that a binary pattern for this case is represented by only one integer number, since there are only 18 breakers in the network and a 32-bit machine is assumed. A binary pattern of the real power network that contains approximately 180 breakers is represented by six integer numbers.

The modification described herein has focused so far on recoding the LOGLISP database into a format useful to PASCAL. This process is only performed during the database construction, and has little effect on the real time operation of the expert alarm processor. Thus the modification of the SEARCH function will now be described.

The compiled version of the function SEARCH is renamed ALEXPAS. The faster execution of ALEXPAS permits the additon of "memory" to the system, allowing for a more accurate analysis and better user interface. In the LOGLISP version the status of the breakers was not considered during the analysis, that is, breakers initially open before the occurrence of the new alarms were not included in the new analysis. In the PASCAL version, the status of the breakers is combined with the new incoming alarms, and the resulting pattern checked against the database. This search relative to prior faults allows the identification of new faults as they occur.

The expert alarm processor's memory of prior conditions requires changes in the format of the input data. ALEXPAS requires as input not only the name of the breaker for which an alarm has been generated, but also the new status (OPEN or CLOSED) of the breaker so that breaker reclosures can be processed. The following example depicts this new format:

STATION-1 B-1 OPEN

STATION-2 B-3 CLOSE

ALEXPAS now consists of a set of 11 procedures and functions that are responsible for reading the database, interfacing with the operator and interpreting data. These functions are presented in detail in the Appendix.

Initially, when ALEXPAS is first run, it reads the database generated by the conversion program. The database is kept in internal variables equivalent to the lists in the LOGLISP version. Once the database is read, the program waits for data (breaker names and status) from the user. It then analyzes the data and displays the results. The user can see the names of all open breakers at any time, just by entering the command STATUS.

The program ALEXPAS is preferably written in such a way that it is completely parametrized, that is, the sizes of the arrays and iterations are defined in terms of constant names at the beginning of the program. In this way, whenever a new database is generated with additional components, fewer parameters in ALEXPAS must be changed. This change in ALEXPAS is necessary to allow the compiler to allocate variables of the correct size. The example below illustrates the process of parametrized definitions of variables, contained in

```
ALEXPAS:
CONST
  n_of_stations = 2;
  n_of_breakers = 12;
  n_of_lines = 2;
  size_of_string = 30 ;
TYPE:
  element = string (size_of_string);
  station_list = packed array [1..n_of_stations] of
    element;
  line_list = packed array [1..n_of_lines] of
    element:
VAR:
  station: station_list;
  breaker: breaker_list;
  line: line_list;
```

First, constant definitions like $n\_of\_stations$, $n\_of\_breakers$, etc. are established. Then, variable types are defined. For example, the first variable type, defines variables of type element as a string of size $size\_of\_string$. The second definition says that any variable of type $station\_list$ is an array of variables of type element. The size of this array is given by the value $n\_of\_stations$. Finally the variable definitions are established. For example, the first one defines 'station' as the name of a variable of type 'station_list'. Using this approach, whenever the size of one of the lists changes, it is necessary only to change the value of the constant associated with the list.

Below are set forth the constants that must be updated whenever the database is expanded, and their current values:
  $n\_of\_stations = 2$
  $n\_of\_breakers = 12$
  $n\_of\_lines = 2$
  $n\_of\_buses = 4$
  $n\_of\_gens = 2$
  $n\_of\_tbs = 2$
  $size\_of\_trip\_list = 24$ To simplify the process of updating the constants, the program CONVALEX automatically writes in the file containing the source code of ALEXPAS the new values of constants from the lists in the new database. The process of updating SEARCHPAS becomes completely transparent to the user and eliminates mistakes. Once the source code is altered it is automatically compiled to generate a new executable version of ALEXPAS.

To summarize, several modifications to the expert system have been described that significantly improve the performance of the LOGLISP implementation of the expert alarm processor. The LOGLISP version's remaining use is to generate the database for the PASCAL implementation. During this process, a new version of the expert system is automatically generated to allocate the memory required by the expert system. This process is completely transparent to the user.

As another enhancement, the expert system preferably processes instantaneous alarm signals through a sliding window in the time domain. At a selected window length (e.g., 6 seconds in a near real time application) the status of the power network is recorded in a database. Alarms in successive windows are combined into a superset which is processed according to the method described above. Thus, any incomplete alarm patterns in one window will be complete in the superset formed from successive alarm sets, for example, through the opening of additional breakers. The present window continually slides in time and the process is repeated for the new window and its previous window. The validity of processing results is not affected by the length of the window because the status of the network at every window of time is saved.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

APPENDIX

A1. THE HYPOTHETICAL POWER NETWORK DESCRIPTION

LC

Breaker

```
(( Breaker  STATION-1  B-1  BUS-A            GEN-1             ))
(( Breaker  STATION-1  B-2  GEN-1            (STATION-2 L1)    ))
(( Breaker  STATION-1  B-3  (STATION-2 L1)   BUS-B             ))
(( Breaker  STATION-1  B-4  BUS-A            GEN-2             ))
(( Breaker  STATION-1  B-5  GEN-2            (STATION-2 L2)    ))
(( Breaker  STATION-1  B-6  (STATION-2 L2)   BUS-B             ))
(( Breaker  STATION-2  B-1  BUS-A            (STATION-1 L1)    ))
(( Breaker  STATION-2  B-2  (STATION-1 L1)   TB1-345KV         ))
(( Breaker  STATION-2  B-3  TB1-345KV        BUS-B             ))
(( Breaker  STATION-2  B-4  BUS-A            (STATION-1 L2)    ))
(( Breaker  STATION-2  B-5  (STATION-1 L2)   TB2-345KV         ))
(( Breaker  STATION-2  B-6  TB2-345KV        BUS-B             ))
```

END-OF-FILE

A2. THE INTERNAL DATABASE

STATION-LIST = (STATION-1 STATION-2)

BREAKER-LIST = ((STATION-1 B-1) (STATION-1 B-2) (STATION-1 B-3)
    (STATION-1 B-4) (STATION-1 B-5) (STATION-1 B-6)
    (STATION-2 B-1) (STATION-2 B-2) (STATION-2 B-3)
    (STATION-2 B-4) (STATION-2 B-5) (STATION-2 B-6))

LINE-LIST = ((STATION-1 STATION-2 L1) (STATION-1 STATION-2 L2))

BUS-LIST = ((STATION-1 BUS-A) (STATION-2 BUS-A)
    (STATION-1 BUS-B) (STATION-2 BUS-B))

TB-LIST = ((STATION-2 TB1-345KV) (STATION-2 TB2-345KV))

GEN-LIST = ((STATION-1 GEN-1) (STATION-1 GEN-2))

FAULT-LIST = ((STATION-1 STATION-2 L1) (STATION-1 STATION-2 L2)
    (STATION-1 BUS-A) (STATION-2 BUS-A) (STATION-1 BUS-B)
    (STATION-2 BUS-B) (STATION-1 GEN-1) (STATION-1 GEN-2)
    (STATION-2 TB1-345KV) (STATION-2 TB2-345KV)
    (STATION-1 B-1) (STATION-1 B-2) (STATION-1 B-3)
    (STATION-1 B-4) (STATION-1 B-5) (STATION-1 B-6)
    (STATION-2 B-1) (STATION-2 B-2) (STATION-2 B-3)
    (STATION-2 B-4) (STATION-2 B-5) (STATION-2 B-6))

BINARY-LIST = ((1 0 0 1 1 1 0 0 1 1 1)
    (1 1 1 0 0 1 1 1 0 0 1)
    (0 1 1 0 1 1 1 1 1 1 1)
    (1 1 1 1 1 0 1 1 0 1 1)
    (1 1 0 1 1 0 1 1 1 1 1)
    (1 1 1 1 1 1 1 0 1 1 0)
    (0 0 1 1 1 1 1 1 1 1 1)
    (1 1 1 0 0 1 1 1 1 1 1)
    (1 1 1 1 1 1 0 0 1 1 1)
    (1 1 1 1 1 1 1 1 1 0 0)
    (1 0 1 0 1 1 1 1 1 1 1)
    (0 1 0 1 1 1 0 0 1 1 1)
    (1 0 1 1 1 0 0 0 1 1 1)
    (0 1 1 1 0 1 1 1 1 1 1)
    (1 1 1 0 1 0 1 1 1 0 0 1)
    (1 1 0 1 0 1 1 1 1 0 0 1)
    (1 0 0 1 1 1 1 0 1 0 1 1)
    (1 0 0 1 1 1 0 1 0 1 1 1)
    (1 1 1 1 1 1 1 0 1 1 1 0)
    (1 1 1 1 0 0 0 1 1 1 0 1)
    (1 1 1 1 0 0 1 1 1 0 1 0)
    (1 1 1 1 1 1 1 1 0 1 0 1))

TRIP-LIST = ((STATION-1 BUS-A) (STATION-1 GEN-1)
    (STATION-1 GEN-1) (STATION-1 STATION-2 L1)
    (STATION-1 STATION-2 L1) (STATION-1 BUS-B)
    (STATION-1 BUS-A) (STATION-1 GEN-2)
    (STATION-1 GEN-2) (STATION-1 STATION-2 L2)
    (STATION-1 STATION-2 L2) (STATION-1 BUS-B)
    (STATION-2 BUS-A) (STATION-1 STATION-2 L1)
    (STATION-1 STATION-2 L1) (STATION-2 TB1-345KV)
    (STATION-2 TB1-345KV) (STATION-2 BUS-B)
    (STATION-2 BUS-A) (STATION-1 STATION-2 L2)
    (STATION-1 STATION-2 L2) (STATION-2 TB2-345KV)
    (STATION-2 TB2-345KV) (STATION-2 BUS-B))

PATTERN-LIST = (((STATION-1 B-3) (STATION-1 B-2) (STATION-2 B-2)
    (STATION-2 B-1))
    ((STATION-1 B-6) (STATION-1 B-5) (STATION-2 B-5)
    (STATION-2 B-4))
    ((STATION-1 B-1) (STATION-1 B-4))

```
         ((STATION-2 B-1) (STATION-2 B-4))
         ((STATION-1 B-3) (STATION-1 B-6))
         ((STATION-2 B-3) (STATION-2 B-6))
         ((STATION-1 B-2) (STATION-1 B-1))
         ((STATION-1 B-5) (STATION-1 B-4))
         ((STATION-2 B-3) (STATION-2 B-2))
         ((STATION-2 B-6) (STATION-2 B-5))
         ((STATION-1 B-4) (STATION-1 B-2))
         ((STATION-1 B-1) (STATION-1 B-3) (STATION-2 B-2)
          (STATION-2 B-1))
         ((STATION-1 B-2) (STATION-2 B-2) (STATION-2 B-1)
          (STATION-1 B-6))
         ((STATION-1 B-1) (STATION-1 B-5))
         ((STATION-1 B-4) (STATION-1 B-6) (STATION-2 B-5)
          (STATION-2 B-4))
         ((STATION-1 B-5) (STATION-2 B-5) (STATION-2 B-4)
          (STATION-1 B-3))
         ((STATION-2 B-4) (STATION-1 B-3) (STATION-1 B-2)
          (STATION-2 B-2))
         ((STATION-1 B-3) (STATION-1 B-2) (STATION-2 B-1)
          (STATION-2 B-3))
         ((STATION-2 B-2) (STATION-2 B-6))
         ((STATION-2 B-1) (STATION-1 B-6) (STATION-1 B-5)
          (STATION-2 B-5))
         ((STATION-1 B-6) (STATION-1 B-5) (STATION-2 B-4)
          (STATION-2 B-6))
         ((STATION-2 B-5) (STATION-2 B-3)))
```

A3. THE LOGLISP IMPLEMENTATION

```
****************************************************************
*                                                              *
*        Member: GENERATE-DATABASE in ALEXLISP°A               *
*                                                              *
****************************************************************
*                                                              *
*        This function generates a new database based on the   *
*        connectivity of the power network. The new database   *
*        is stored in a file called ALEX.DB.                   *
*                                                              *
****************************************************************

(GENERATE-DATABASE
  (VALUE
    (LAMBDA NIL
      (GENERATE-SBN-LISTS)
      (GENERATE-LISTS NON-BREAKER-LIST)
      (GENERATE-PATTERN)
      (GENERATE-BINARY)
      (GENERATE-TRIP)
      (UPDATE-DATABASE) )))

****************************************************************
*                                                              *
*        Member: GENERATE-LISTS in ALEXLISP°A                  *
*                                                              *
****************************************************************
*                                                              *
*        This function generates the lists LINE-LIST, BUS-LIST, TB-LIST, *
*        GEN-LIST and NON-BREAKER-LIST, based on the connectivity *
*        of the power network.                                 *
*                                                              *
****************************************************************
```

```
(GENERATE-LISTS
  (VALUE
    (LAMBDA (LST)
      (SETQ LINE-LIST NIL)
      (SETQ BUS-LIST NIL)
      (SETQ TB-LIST NIL)
      (SETQ GEN-LIST NIL)
      (MAPCAR
        (LAMBDA (X)
          (SETQ ITEM (LAST X))
          (COND
            ( (LISTP ITEM)
              (SETQ LINE-LIST (UNION LINE-LIST (LIST (LINE X)))) )
            ( (= (SUBSTRING ITEM 0 2) "BU")
              (SETQ BUS-LIST (UNION BUS-LIST (LIST X))) )
            ( (= (SUBSTRING ITEM 0 2) "TB")
              (SETQ TB-LIST (UNION TB-LIST (LIST X))) )
            ( (= (SUBSTRING ITEM 0 2) "GE")
              (SETQ GEN-LIST (UNION GEN-LIST (LIST X))) ) ) )
        LST)
      (SETQ FAULT-LIST (APPEND LINE-LIST BUS-LIST GEN-LIST TB-LIST
                               BREAKER-LIST)) )))
```

```
************************************************************
*                                                          *
*       Member: LINE in ALEXLISP*A                         *
*                                                          *
************************************************************
*                                                          *
*     This function converts the name of a transmission line as it appears *
*     in NON-BREAKER-LIST, to the form expected in LINE-LIST. *
*     Ex. coverts a line name in the form (A (B 1)) to the form (A B 1). *
*                                                          *
************************************************************
```

```
(LINE
  (VALUE
    (LAMBDA (LST)
      (UNION (SORT (UNION (CAR LST) (CAR (LAST LST))))
             (LAST (LAST LST))))))
```

```
************************************************************
*                                                          *
*       Member: GENERATE-PATTERN in ALEXLISP*A             *
*                                                          *
************************************************************
*                                                          *
*     Generates a pattern of fault for each element in the power network. *
*     The patterns generates are stored in PATTERN-LIST.   *
*                                                          *
************************************************************
```

```
(GENERATE-PATTERN
  (VALUE
    (LAMBDA NIL
      (SETQ LINE-PATTERN (MAPCAR LINE-FAULT LINE-LIST))
      (SETQ BUS-PATTERN (MAPCAR BUS-FAULT BUS-LIST))
      (SETQ TB-PATTERN (MAPCAR BUS-FAULT TB-LIST))
      (SETQ GEN-PATTERN (MAPCAR BUS-FAULT GEN-LIST))
      (SETQ BREAKER-PATTERN (MAPCAR BREAKER-FAULT BREAKER-LIST))
      (SETQ PATTERN-LIST (APPEND LINE-PATTERN BUS-PATTERN GEN-PATTERN
                                 TB-PATTERN BREAKER-PATTERN)) )))
```

```
*************************************************************
*                                                           *
*         Member: BREAKER-FAULT in ALEXLISP*A               *
*                                                           *
*************************************************************
*                                                           *
*     Returns all the breakers that would trip if a fault occurs in one of  *
*     the elements connected to the breaker received as parameter,          *
*     assuming that this breaker is stuck (faulty breaker).                 *
*                                                           *
*************************************************************

(BREAKER-FAULT
  (VALUE
    (LAMBDA (BRK)
      (SETQ TMP (TRIP BRK))
      (SETDIFFERENCE
            (UNION (FAULT (CAR TMP)) (FAULT (LAST TMP)))
            (LIST BRK)) )))

*************************************************************
*                                                           *
*         Member: GENERATE-BINARY in ALEXLISP*A             *
*                                                           *
*************************************************************
*                                                           *
*     Converts the patterns of fault in PATTERN-LIST to their binary  *
*     representation. The patterns generated are stored in a list called *
*     BINARY-LIST.                                                      *
*                                                           *
*************************************************************

(GENERATE-BINARY
  (VALUE
    (LAMBDA NIL
      (SETQ BINARY-LIST NIL)
      (MAPCAR
        (LAMBDA (LST)
          (SETQ BINARY-LIST (UNION BINARY-LIST (LIST (MAP-PATTERN LST)))))
        PATTERN-LIST) )))

*************************************************************
*                                                           *
*         Member: MAP-PATTERN in ALEXLISP*A                 *
*                                                           *
*************************************************************
*                                                           *
*     This function maps the pattern of fault received as parameter,    *
*     into its binary representation. The binary pattern generated is   *
*     returned to the calling function                                  *
*                                                           *
*************************************************************

(MAP-PATTERN
  (VALUE
    (LAMBDA (PLST)
      (SETQ ONE-LIST (MTON 1 (LENGTH BREAKER-LIST)))
      (SETQ ONE-LIST (MAPCAR / ONE-LIST ONE-LIST))
      (SETQ NLIST (COPY ONE-LIST))
      (MAPCAR (LAMBDA (X) (SETELT NLIST (FIND-INDEX X) NIL)) PLST)
      (RETURN NLIST) )))
```

```
*************************************************************
*                                                           *
*          Member: FIND-INDEX in ALEXLISP*A                 *
*                                                           *
*************************************************************
*                                                           *
*     Returns the position of the breaker received as parameter, in  *
*     the BREAKER-LIST.                                     *
*                                                           *
*************************************************************

(FIND-INDEX
  (VALUE
    (LAMBDA (X)
      (- (LENGTH BREAKER-LIST) (LENGTH (MEMBER X BREAKER-LIST))))))

*************************************************************
*                                                           *
*          Member: GENERATE-TRIP in ALEXLISP*A              *
*                                                           *
*************************************************************
*                                                           *
*     Generates a list containing the elements connected to each breaker  *
*     in the network. Each element of this list contains the names of the *
*     elements connected to the corresponding breakers in BREAKER-LIST.   *
*     These elements are stored in a list called by TRIP-LIST.            *
*                                                           *
*************************************************************

(GENERATE-TRIP
  (VALUE
    (LAMBDA NIL
      (SETQ TRIP-LIST NIL)
      (MAPCAR
        (LAMBDA (X)
          (SETQ TRIP-LIST (APPEND TRIP-LIST (TRIP X))))
        BREAKER-LIST) )))

*************************************************************
*                                                           *
*          Member: UPDATE-DATABASE in ALEXLISP*A            *
*                                                           *
*************************************************************
*                                                           *
*     Saves the new database in a file called ALEX.DB.      *
*     The database is composed by the lists:                *
*         STATION-LIST, BREAKER-LIST, LINE-LIST, BUS-LIST,  *
*     TB-LIST, GEN-LIST, FAULT-LIST, BINARY-LIST, TRIP-LIST *
*     and PATTERN-LIST.                                     *
*     These lists must be saved in this order.              *
*                                                           *
*************************************************************

(UPDATE-DATABASE
  (VALUE
    (LAMBDA NIL
      (OBEY "ERASE EXAMPLE DB A")
      (SETQ OUT (MAKE-OUTSTREAM '(EXAMPLE DB A)))
      (PRINT STATION-LIST OUT)
      (PRINT BREAKER-LIST OUT)
      (PRINT LINE-LIST OUT)
      (PRINT BUS-LIST OUT)
      (PRINT TB-LIST OUT)
```

```
(PRINT GEN-LIST OUT)
(PRINT FAULT-LIST OUT)
(PRINT BINARY-LIST OUT)
(PRINT TRIP-LIST OUT)
(PRINT PATTERN-LIST OUT)
(SHUT OUT) )))
```

```
*****************************************************************
*                                                                *
*         Member: LOAD-DATABASE in ALEXLISP°A                    *
*                                                                *
*****************************************************************
*                                                                *
*         Reads all the lists stored in the file ALEX.DB.        *
*         The lists must be read in the following order:         *
*         STATION-LIST, BREAKER-LIST, LINE-LIST, BUS-LIST,       *
*         TB-LIST, GEN-LIST, FAULT-LIST, BINARY-LIST, TRIP-LIST  *
*         and PATTERN-LIST.                                      *
*         As the lists BINARY-LIST and TRIP-LIST are not used in this *
*         implementation, they are read and then discarded.      *
*                                                                *
*****************************************************************

(LOAD-DATABASE
  (VALUE
    (LAMBDA NIL
      (SETQ IN (MAKE-INSTREAM '(EXAMPLE DB A)))
      (SETQ STATION-LIST (READ IN))
      (SETQ BREAKER-LIST (READ IN))
      (SETQ LINE-LIST (READ IN))
      (SETQ BUS-LIST (READ IN))
      (SETQ TB-LIST (READ IN))
      (SETQ GEN-LIST (READ IN))
      (SETQ FAULT-LIST (READ IN))
      (SETQ BINARY-LIST (READ IN))
      (SETQ BINARY-LIST NIL)
      (SETQ TRIP-LIST (READ IN))
      (SETQ TRIP-LIST NIL)
      (SETQ PATTERN-LIST (READ IN))
      (SHUT IN) )))
```

```
*****************************************************************
*                                                                *
*         Member: SEARCH in ALEXLISP°A                           *
*                                                                *
*****************************************************************
*                                                                *
*    This function searches for the possible faulty elements in the power *
*    network that would cause the set of breakers received as input to trip. *
*    This function is available to the user.                     *
*                                                                *
*****************************************************************

(SEARCH
  (VALUE
    (LAMBDA (LST)
      (SETQ RESULT-LIST NIL)
      (SETQ CUMULATIVE-LIST NIL)
      (MAPCAR
        (LAMBDA (X Y)
          (COND
            ( (NOT (SETDIFFERENCE Y LST))
              (COND
                ( (= (LENGTH X) 3)
                  (SETQ RESULT-LIST (UNION RESULT-LIST (LIST X))) )
                ( (= (SUBSTRING (LAST X) 0 2) "BU")
```

```
            (SETQ RESULT-LIST (UNION RESULT-LIST (LIST X))) )
         ( (= (SUBSTRING (LAST X) 0 2) "GE")
            (SETQ RESULT-LIST (UNION RESULT-LIST (LIST X))) )
         ( (= (SUBSTRING (LAST X) 0 2) "TB")
            (SETQ RESULT-LIST (UNION RESULT-LIST (LIST X))) )
         ( 'ELSE
            (COND
               ( (NOT (MEMBER X LST))
                  (SETQ RESULT-LIST
                     (UNION RESULT-LIST (UNION (LIST X) (TRIP X)))) ) ) ) )
      (SETQ CUMULATIVE-LIST (UNION CUMULATIVE-LIST Y)) ) )
   FAULT-LIST
   PATTERN-LIST)
(SETQ UNKNOWN-LIST (SETDIFFERENCE LST BREAKER-LIST))
(SETQ TELE-LIST (SETDIFFERENCE LST CUMULATIVE-LIST))
(SETQ TELE-LIST (SETDIFFERENCE TELE-LIST UNKNOWN-LIST))
(SHOW-RESULTS)
(RETURN 'Done) )))
```

```
*****************************************************************
*                                                                *
*           Member: SHOW-RESULTS in ALEXLISP*A                   *
*                                                                *
*****************************************************************
*                                                                *
*    Display to the user the result of the analysis performed by the *
*    function SEARCH. The results will be stored in 3 lists:     *
*         UNKNOWN-LIST: contains the breakers not recognized by the *
*                       expart system;                           *
*         RESULT-LIST: contains the possible faulty elements in the *
*                      network;                                  *
*         TELE-LIST: contains the breakers that tripped with no fault *
*                    associated to the event.                    *
*                                                                *
*****************************************************************
```

```
(SHOW-RESULTS
   (VALUE
      (LAMBDA NIL
         (COND
            ( UNKNOWN-LIST
               (MAPCAR
                  (LAMBDA (X) (PRINT (LIST 'Unknown 'breaker: X))) UNKNOWN-LIST) )
            ( 'ELSE
               (COND
                  ( RESULT-LIST
                     (MAPCAR (LAMBDA (Y) (PRINT (LIST 'Fault 'in: Y))) RESULT-LIST) ) )
               (COND
                  ( TELE-LIST
                     (MAPCAR (LAMBDA (Z) (PRINT (LIST 'Breaker 'trip: Z))) TELE-LIST) ) ) ) ) )))
```

```
*****************************************************************
*                                                                *
*           Member: FAULT in ALEXLISP*A                          *
*                                                                *
*****************************************************************
*                                                                *
*    This function returns a set containing the breakers that would trip *
*    if a fault has occurred in the element received as parameter. *
*    The element can be a breaker, a line, a generator, a transformer *
*    or a bus.                                                   *
*    This function is available to the user.                     *
*                                                                *
*****************************************************************
```

```
(FAULT
  (VALUE
    (LAMBDA (ELM)
      (COND
        ( (= (LENGTH ELM) 3)
          (LINE-FAULT ELM) )
        ( (= (SUBSTRING (LAST ELM) 0 2) "BU")
          (BUS-FAULT ELM) )
        ( (= (SUBSTRING (LAST ELM) 0 2) "GE")
          (BUS-FAULT ELM) )
        ( (= (SUBSTRING (LAST ELM) 0 2) "TB")
          (BUS-FAULT ELM) )
        ( 'ELSE
          (BREAKER-FAULT ELM) ) )))
```

```
***********************************************************************
*                                                                     *
*        Member: GENERATE-SBN-LISTS in ALEXLOG*A                      *
*                                                                     *
***********************************************************************
*                                                                     *
*    This function generates STATION-LIST, BREAKER-LIST and           *
*    NON-BREAKER-LIST.                                                *
*    As it contains LOGLISP commands, it cannot be compiled.          *
*                                                                     *
***********************************************************************
```

```
(GENERATE-SBN-LISTS
  (VALUE
    (LAMBDA NIL
      (SETQ STATION-LIST (SORT (ALL s (Breaker s # # #))))
      (SETQ BREAKER-LIST (ALL (s x) (Breaker s x # #)))
      (SETQ NON-BREAKER-LIST
            (UNION (ALL (s x) (Breaker s # x #))
                   (ALL (s x) (Breaker s # # x)))) )))
```

```
***********************************************************************
*                                                                     *
*        Member: INITIALIZE in ALEXLOG*A                              *
*                                                                     *
***********************************************************************
*                                                                     *
*    This function is automatically executed when the expert system is *
*    loaded. It reads the file containing the description of the power *
*    network, and then it loads the database.                         *
*    As this function contains LOGLISP commands, it cannot be compiled. *
*                                                                     *
***********************************************************************
```

```
(INITIALIZE
  (VALUE
    (LAMBDA NIL
      (RESTORE NEWBREAK)
      (LOAD-DATABASE))))
```

```
*************************************************************************
*                                                                       *
*            Member: LINE-FAULT in ALEXLOG*A                            *
*                                                                       *
*************************************************************************
*                                                                       *
*       This function returns a set of breakers that will trip if a fault occurs *
*       in the transmission line received as parameter.                 *
*       As this function contains LOGLISP commands, it cannot be compiled. *
*                                                                       *
*************************************************************************

(LINE-FAULT
  (VALUE
    (LAMBDA (LIN)
      (SETQ ST1 (CAR LIN))
      (SETQ ST2 (CADR LIN))
      (SETQ ID (LAST LIN))
      (UNION
        (ALL
          (s b)
          (OR (Breaker s b (y z) #) (Breaker s b # (y z)))
          (= s (EVAL ST1))
          (= y (EVAL ST2))
          (= z (EVAL ID)))
        (ALL
          (s b)
          (OR (Breaker s b (y z) #) (Breaker s b # (y z)))
          (= s (EVAL ST2))
          (= y (EVAL ST1))
          (= z (EVAL ID)))) )))

*************************************************************************
*                                                                       *
*            Member: BUS-FAULT in ALEXLOG*A                             *
*                                                                       *
*************************************************************************
*                                                                       *
*       This function returns a set of breakers that will trip if a fault occurs *
*       in the bus received as parameter.                               *
*       As this function contains LOGLISP commands, it cannot be compiled. *
*                                                                       *
*************************************************************************

(BUS-FAULT
  (VALUE
    (LAMBDA (BUS)
      (SETQ BS (CAR BUS))
      (SETQ BN (LAST BUS))
      (ALL (s b)
        (OR (Breaker s b y #) (Breaker s b # y))
        (= s (EVAL BS))
        (= y (EVAL BN))) )))

*************************************************************************
*                                                                       *
*            Member: TRIP in ALEXLOG*A                                  *
*                                                                       *
*************************************************************************
*                                                                       *
*       This function returns elements connected to the breaker received as *
*       parameter                                                       *
*       This function is available to the user.                         *
*       As this function contains LOGLISP commands, it cannot be compiled. *
*                                                                       *
*************************************************************************
```

```
(TRIP
  (VALUE
    (LAMBDA (BRK)
      (SETQ BST (CAR BRK))
      (SETQ BID (LAST BRK))
      (MAPCAR
        (LAMBDA (X)
          (COND
            ( (LISTP X)
              (LINE (LIST BST X)) )
            ( 'ELSE
              (LIST BST X) ) ) )
        (THE (x y) (Breaker (EVAL BST) (EVAL BID) x y))) )))
```

A4. THE DATABASE CONVERSION PROGRAM program convalex;

```
(*****************************************************
 *                                                   *
 *           EXTERNAL  FUNCTIONS                     *
 *                                                   *
 *****************************************************)
```

% include CMS

```
(*****************************************************
 *                                                   *
 *           DEFINITION  OF  CONSTANTS               *
 *                                                   *
 *****************************************************)
``` const
    size_of_record = 80;
    size_of_word = 32;      {word of 32 bits}

```
(*****************************************************
 *                                                   *
 *           DEFINITION  OF  VARIABLES               *
 *                                                   *
 *****************************************************)
```

VAR
    n_of_stations: integer;
    n_of_breakers: integer;
    n_of_lines: integer;
    n_of_buses: integer;
    n_of_tbs: integer;
    n_of_gens: integer;
    size_of_fault_list: integer;
    size_of_trip_list: integer;
    pattern: integer;
    infile: text;
    outfile: text;
    alex: text;
    srcfile: text;
    index: integer;
    buffer_aux: packed array [1..size_of_record] of char;

```
(*****************************************************************
 *                                                                *
 *                        CONVERT_LIST                            *
 *                                                                *
 ******************************************************************
 *                                                                *
 *       This function reads a list from the file ALEX.DB, converts it in such *
 *   a way that each element of the list is written, without parenthesis, in one *
 *   line of the file ALEXDB.PASCAL                               *
 *   This function converts only lists containing name of elements. *
 *   It returns the total number of elements in the list.         *
 *                                                                *
 *****************************************************************)

function convert_list: integer;

const
    size_of_string = 30;
    null_string = '                              ';

var
    i, k, size_of_list, parenthesis: integer;
    last_char: char;
    buffer: packed array [1..size_of_record] of char;
    end_of_list: boolean;
    element: packed array [1..size_of_string] of char;

begin
    end_of_list := false;
    k := 1;
    i := 0;
    size_of_list := 0;
    parenthesis := 0;
    last_char := ' ';
    while not end_of_list do begin
        for k := 1 to size_of_record do buffer[k] := ' ';
        readln (infile, buffer);
        for k := 1 to size_of_record do begin
            case buffer[k] of '(': begin
                        i := 1;
                        element := null_string;
                        parenthesis := parenthesis + 1;
                     end;

')': begin
                        parenthesis := parenthesis - 1;
                        if last_char <> ')' then begin
                            writeln (outfile, element);
                            size_of_list := size_of_list + 1;
                        end;
                        if parenthesis = 0 then end_of_list := true;
                     end;

' ': begin
                        if ((last_char <> ' ') and
                            (last_char <> '(')) then
                            if ((last_char <> ')') and
                                (parenthesis =1)) then begin
                                writeln (outfile, element);
                                size_of_list := size_of_list + 1;
                                i := 1;
                                element := null_string;
                            end
```

```
                    else if (parenthesis = 2) then begin
                            element[i] := buffer[k];
                            i := i + 1;
                        end;
                end;
            '/': begin
                end;

otherwise
                begin
                    element[i] := buffer[k];
                    i := i + 1;
                end;
            end;
            if buffer[k] <> '/' then last_char := buffer[k];
        end;
    end;
    convert_list := size_of_list;
end;

(*****************************************************************************
 *
 *                   CONVERT_PATTERN
 *
 *****************************************************************************
 *
 *       This function converts the list BINARY-PATTERN in the file
 *   ALEX.DB in such a way that each element of this list is divided in
 *   groups of 32 characters 1 and NIL's. This group of 32 elements is
 *   then transformed into an integer number, and then stored in the file
 *   ALEXDB.PASCAL.
 *       It returns the total number of elements in the BINARY-PATTERN list.
 *
 *****************************************************************************)

procedure convert_pattern;

const    mask = 1;

var i, k, n_bits, parenthesis: integer;
    buffer: packed array [1..size_of_record] of char;
    pattern: integer;
    end_of_pattern: boolean;

begin
    i := 0;
    n_bits := 0;
    parenthesis := 0;
    while not end_of_pattern do begin
        readln (infile, buffer);
        for k:= 1 to size_of_record do begin
            case buffer[k] of '1': begin
                    pattern := (pattern << 1) | mask;
                    n_bits := n_bits + 1;
                    if (n_bits = size_of_word) then begin
                        writeln (outfile, pattern);
                        n_bits := 0;
                        pattern := 0;
                    end;
                end;

'N': begin
                    pattern := pattern << 1;
                    n_bits := n_bits + 1;
                    if (n_bits = size_of_word) then begin
                        writeln (outfile, pattern);
                        n_bits := 0;
                        pattern := 0;
                    end;
```

```
                        end;

'(': begin
                    parenthesis := parenthesis + 1;
                    if parenthesis = 2 then begin
                        n_bits := 0;
                        pattern := 0;
                    end;
                end;

')': begin
                    parenthesis := parenthesis - 1;
                    if parenthesis = 1 then begin
                        pattern := pattern <<
                                    (size_of_word - n_bits);
                        pattern := pattern |
                            (^((-1) << (size_of_word - n_bits)));
                        writeln (outfile, pattern);
                    end
                    else end_of_pattern := true;
                end;

otherwise begin
                end;
            end;
        end;
    end;
end;

(*******************************************************************
 *                                                                  *
 *                    M A I N   P R O G R A M                       *
 *                                                                  *
 *******************************************************************)

begin
    reset (infile, 'NAME = alex.db.a1');
    rewrite (outfile, 'NAME = alex.dbpascal.a1');
    n_of_stations := convert_list;
    n_of_breakers := convert_list;
    n_of_lines := convert_list;
    n_of_buses := convert_list;
    n_of_tbs := convert_list;
    n_of_gens := convert_list;
    size_of_fault_list := convert_list;
    convert_pattern;
    size_of_trip_list := convert_list;
    close (infile);
    close (outfile);

(**** generate ALEX.SOURCE.A1 based on ALEXPAS.PASCAL.A1 ****)

reset (alex, 'NAME = alexpas.pascal.a1');
    rewrite (srcfile, 'NAME = alex.source.a1');
    for index := 1 to 4 do begin
        readln (alex, buffer_aux);
        writeln (srcfile, buffer_aux);
    end;
    writeln (srcfile, '    n_of_stations = ', n_of_stations: 4, ';');
    writeln (srcfile, '    n_of_breakers = ', n_of_breakers: 4, ';');
    writeln (srcfile, '    n_of_lines = ', n_of_lines: 4, ';');
    writeln (srcfile, '    n_of_buses = ', n_of_buses: 4, ';');
    writeln (srcfile, '    n_of_gens = ', n_of_gens: 4, ';');
    writeln (srcfile, '    n_of_tbs = ', n_of_tbs: 4, ';');
    writeln (srcfile,
            '    size_of_trip_list = ', size_of_trip_list: 4, ';');
    for index := 5 to 11 do readln (alex, buffer_aux);
    while not EOF (alex) do begin
        readln (alex, buffer_aux);
        writeln (srcfile, buffer_aux);
    end;
```

```
        close (srcfile);
        close (alex);

(**** copy ALEX.SOURCE.A1 to ALEXPAS.PASCAL.A1   ****)

reset (srcfile, 'NAME = alex.source.a1');
        rewrite (alex, 'NAME = alexpas.pascal.a1');
        while not EOF (srcfile) do begin
             readln (srcfile, buffer_aux);
             writeln (alex, buffer_aux);
        end;
        close (alex);
        close (srcfile);

(* erase the file ALEX.SOURCE.A1 *)
        rewrite (srcfile, 'NAME = alex.source.a1');
        close (srcfile);

end.
```

A5. THE OPTIMIZED VERSION IN PASCAL

```
program alexpas;

CONST
      n_of_stations =   31;
      n_of_breakers = 181;
      n_of_lines =   51;
      n_of_buses =   54;
      n_of_gens =   15;
      n_of_tbs =   20;
      size_of_trip_list =  362;

(************************************************************
 *                                                          *
 *         DEFINITION  OF  CONSTANTS                        *
 *                                                          *
 ************************************************************)

size_of_fault_list = n_of_breakers+n_of_lines+n_of_buses+n_of_tbs+n_of_gens;
      size_of_string = 30;
      size_of_word = 32;
      p = n_of_breakers div size_of_word;
      q = n_of_breakers mod size_of_word;
      n_of_words = p + ((q + (size_of_word - 1)) div size_of_word);
      n_of_elmts = size_of_trip_list div n_of_breakers;

(************************************************************
 *                                                          *
 *         DEFINITION  OF  TYPES                            *
 *                                                          *
 ************************************************************)

TYPE
      element = string (size_of_string);
      station_list = packed array[1..n_of_stations] of element;
      breaker_list = packed array[1..n_of_breakers] of element;
      line_list = packed array[1..n_of_lines] of element;
      bus_list = packed array[1..n_of_buses] of element;
      tb_list = packed array[1..n_of_tbs] of element;
      gen_list = packed array[1..n_of_gens] of element;
      fault_list = packed array[1..size_of_fault_list] of element;
      pattern_of_fault = packed array [1..n_of_words] of integer;
      pattern_list = packed array [1..size_of_fault_list] of
                                              pattern_of_fault;
      trip_elmt = packed array [1..n_of_elmts] of element;
      trip_list = packed array [1..n_of_breakers] of trip_elmt;
```

```
(******************************************************************
 *                                                                *
 *         DEFINITION OF STRUCTURED CONSTANTS                     *
 *                                                                *
 ******************************************************************)

CONST
    all_ones = pattern_of_fault ((^(0)): n_of_words);

(******************************************************************
 *                                                                *
 *         DEFINITION OF GLOBAL VARIABLES                         *
 *                                                                *
 ******************************************************************)

VAR
    station: station_list;
    breaker: breaker_list;
    line: line_list;
    bus: bus_list;
    tb: tb_list;
    gen: gen_list;
    fault: fault_list;
    pattern: pattern_list;
    trip: trip_list;
    search_list: fault_list;
    length_of_search_list: integer;
    cum_list: pattern_of_fault;
    new_breaker: element;
    new_pattern: pattern_of_fault;
    current_pattern: pattern_of_fault;
    old_search_list: fault_list;
    length_of_old_list: integer;
    ttyout: text;
    ttyin: text;

(******************************************************************
 *                                                                *
 *                  INITIALIZE_VARIABLES                          *
 *                                                                *
 ******************************************************************
 *                                                                *
 *     This procedure initialize some of the global variables.    *
 *   It initializes the variables LENGTH_OF_OLD_LIST and          *
 *   CURRENT_PATTERN as if no faults occurred previously.         *
 *                                                                *
 ******************************************************************)

procedure initialize_variables;

begin
    current_pattern := all_ones;
    length_of_old_list := 0;
end;
```

```
(*******************************************************************
 *
 *                    READ_DATA_BASE
 *
 *******************************************************************
 *
 *      This procedure reads the database contained in the file
 *   ALEX.DBPASCAL.A1, which was generated by the program 'CONVERT'.
 *   The following lists are read from the database (in this order):
 *
 *       STATION-LIST:      contains the names of all stations;
 *       BREAKER-LIST:      contains the names of all breakers;
 *       LINE-LIST:         contains the names of all lines;
 *       BUS_LIST:          contains the names of all buses;
 *       TB_LIST:           contains the names of all transformer banks;
 *       GEN_LIST:          contains the names of all generators;
 *       FAULT_LIST:        contains the names of all elements;
 *                          (lines, buses, transformer banks, generators,
 *                           and breakers, in this order).
 *
 *******************************************************************)

procedure read_data_base;

var i, j: integer;
    infile: text;

begin
    reset (infile, 'NAME = alex.dbpascal.a1');

for i := 1 to n_of_stations do readln (infile, station[i]);
    for i := 1 to n_of_breakers do readln (infile, breaker[i]);
    for i := 1 to n_of_lines do readln (infile, line[i]);
    for i := 1 to n_of_buses do readln (infile, bus[i]);
    for i := 1 to n_of_tbs do readln (infile, tb[i]);
    for i := 1 to n_of_gens do readln (infile, gen[i]);
    for i := 1 to size_of_fault_list do readln (infile, fault[i]);

for i:= 1 to size_of_fault_list do
        for j:=1 to n_of_words do readln (infile, pattern[i][j]);

for i := 1 to n_of_breakers do
        for j := 1 to n_of_elmts do readln (infile, trip[i][j]);

close (infile);
end;

(*******************************************************************
 *
 *                    FIND_BREAKER_INDEX
 *
 *******************************************************************
 *
 *      This function finds and returns the position in the BREAKER-LIST,
 *   of the breaker whose name is in the variable called NEW_BREAKER.
 *   If the breaker name is not found in the BREAKER-LIST, the number 0 is
 *   returned.
 *
 *   A sequential search is used to find out the breaker index.
 *   This function does not modify any global variable, but it accesses the variables
 *   'new_breaker' and 'breaker'.
 *
 *******************************************************************)

function find_breaker_index: integer;

var i: integer;
    valid: boolean;
```

```
begin
    valid := false;
    i := 1;
    while (not valid) and (i <= n_of_breakers) do
        if new_breaker = breaker[i] then valid := true
                                    else i := i + 1;
    if valid then find_breaker_index := i
             else find_breaker_index := 0;
end;
```

(*************************************************************
 *
 *                    RESET_BIT
 *
 **************************************************************
 *
 *     This procedure resets the bit of the variable NEW_PATTERN,
 *  which position is given by the number received as parameter.
 *  The first position of a bit is the first bit (most significant bit) of the first
 *  integer that forms the variable NEW_PATTERN.
 *     This procedure alters the global variable NEW_PATTERN.
 *
 *************************************************************)

```
procedure reset_bit (position: integer);

var bit_mask: integer;
    j: integer;

begin
    bit_mask := (1 << (size_of_word - 1));
    bit_mask := bit_mask >> ((position - 1) mod size_of_word);
    bit_mask := ^(bit_mask);
    j := ((position - 1) div size_of_word) + 1;
    new_pattern[j] := new_pattern[j] & bit_mask;
end;
```

(*************************************************************
 *
 *                    SET_BIT
 *
 **************************************************************
 *
 *     This procedure sets the bit of the variable CURRENT_PATTERN, which
 *  position is given by the number received as parameter.
 *  The first position of a bit is the first bit (most significant bit) of the first
 *  integer that forms the variable CURRENT_PATTERN.
 *     This procedure alters the global variable CURRENT_PATTERN.
 *
 *************************************************************)

```
procedure set_bit (position: integer);

var bit_mask: integer;
    j: integer;

begin
    bit_mask := (1 << (size_of_word - 1));
    bit_mask := bit_mask >> ((position - 1) mod size_of_word);
    j := ((position - 1) div size_of_word) + 1;
    current_pattern[j] := current_pattern[j] | bit_mask;
end;
```

(°°°°°°°°°°°°°°°°°°°°°°°°°°°°°°°°°°°°°°°°°°°°°°°°°°°°°°°°°°°°°°°
°                                                               °
°                    WRITE_SYSTEM_STATUS                        °
°                                                               °
°°°°°°°°°°°°°°°°°°°°°°°°°°°°°°°°°°°°°°°°°°°°°°°°°°°°°°°°°°°°°°°°
°                                                               °
°      This procedure writes to the user the current status of the system,  °
°   that is, the breakers that tripped and are still opened.     °
°                                                               °
°°°°°°°°°°°°°°°°°°°°°°°°°°°°°°°°°°°°°°°°°°°°°°°°°°°°°°°°°°°°°°°)

```
procedure write_system_status;
const
    msg_status = 'Current System Status:';
    msg_closed = 'There is no breaker opened.';
    msg_open = ' OPEN';

var i, j, k: integer;
    aux: pattern_of_fault;
    all_bits_one: boolean;
    bit_mask: integer;
    temp: element;
begin
    writeln (ttyout, msg_status);
    all_bits_one := true;
    for i := 1 to n_of_words do begin
        aux[i] := current_pattern[i] & new_pattern[i];
        all_bits_one := all_bits_one and (aux[i] = ^(0));
    end;
    if all_bits_one then writeln (ttyout, msg_closed)
    else begin
        for i := 1 to n_of_words do begin
            bit_mask := ((^(0)) << (size_of_word - 1));
            if (aux[i] <> ^(0)) then begin
                for j := 1 to size_of_word do begin
                    if (aux[i] & bit_mask) = 0 then begin
                        k := ((i - 1) * size_of_word) + j;
                        temp := trim (breaker[k]);
                        writeln (ttyout, temp, msg_open);
                    end;
                    bit_mask := bit_mask >> 1;
                end;
            end;
        end;
    end;
end;
```

(°°°°°°°°°°°°°°°°°°°°°°°°°°°°°°°°°°°°°°°°°°°°°°°°°°°°°°°°°°°°°°°
°                                                               °
°                       GET_BREAKERS                             °
°                                                               °
°°°°°°°°°°°°°°°°°°°°°°°°°°°°°°°°°°°°°°°°°°°°°°°°°°°°°°°°°°°°°°°°
°                                                               °
°    This function allows the user to enter a set of breakers to be analyzed.  °
°   It will send an error message to the user, whenever the user enters a breaker  °
°   which is not defined in the database.                         °
°   If the user hits RETURN twice without having entered a valid breaker  °
°   previously, the function will return to the caller the value FALSE, indicating  °
°   that the user wants to terminate the program. Otherwise, the function will  °
°   return the value TRUE, indicating to the caller to analyze the data just  °
°   input. Whenever the user enters a valid breaker, this function will build the  °
°   variable NEW_PATTERN by calling the procedure RESET_BIT, and will  °
°   update the variable CURRENT_PATTERN by calling the procedure  °
°   CURRENT_PATTERN. The final value of CURRENT_PATTERN will be  °
°   given by an OR of its value and NEW_PATTERN.                 °
°                                                               °
°°°°°°°°°°°°°°°°°°°°°°°°°°°°°°°°°°°°°°°°°°°°°°°°°°°°°°°°°°°°°°°)

```
function get_breakers: boolean;

const
    msg_enter_name = 'Enter breaker name, followed by RETURN:';
    msg_invalid = 'Invalid status. Enter data again.';
    msg_failure = 'Failure: I have never heard of ';
```

```
    var more, quit: boolean;
        brk_index: integer;
        i, j, k, m: integer;
        trip: boolean;
begin
    new_pattern := all_ones;
    more := true;
    quit := true;
    writeln (ttyout, msg_enter_name);
    while more do begin
            readln (ttyin, new_breaker);
            m := length (new_breaker);
            if m = 0 then more := false
            else begin
                new_breaker := compress (new_breaker);
                new_breaker := ltrim (new_breaker);
                j := index (new_breaker, 'OPEN');
                k := index (new_breaker, 'CLOSE');
                if (j = 0) and (k = 0) then begin
                    j := index (new_breaker, 'STATUS');
                    if j = 0 then writeln (ttyout, msg_invalid)
                        else write_system_status;
                end
                else begin
                    if j <> 0 then begin
                        new_breaker := delete (new_breaker, j);
                        trip := true;
                    end
                    else begin
                        new_breaker := delete (new_breaker, k);
                        trip := false;
                    end;
                        brk_index := find_breaker_index;
                        if brk_index = 0 then writeln (ttyout, msg_failure,
                                                        new_breaker)
                            else begin
                                if trip then reset_bit (brk_index)
                                    else set_bit (brk_index);
                                quit := false;
                            end;
                    end;
                end;
            end;
            for i := 1 to n_of_words do
                current_pattern[i] := current_pattern[i] & new_pattern[i];
        get_breakers := quit;
    end;
```

```
(****************************************************************
*                                                                *
*                      BUILD_SEARCH_LIST                         *
*                                                                *
******************************************************************
*                                                                *
*    This procedure builds the search list based in the pattern of faults  *
* contained in the variable CURRENT_PATTERN. The procedure compares        *
* CURRENT_PATTERN with each element of the variable PATTERN                *
* (the PATTERN-LIST). Whenever we find an element of PATTERN that is a     *
* subset of CURRENT_PATTERN, we take the element (line, bus, generator,    *
* transformer bank, or breaker) associated with this pattern of fault, and *
* consider it a faulty element. If the element found is a breaker, we check if *
* this breaker appears as one of those received as input. If it appears, then it *
* is discarded since a breaker that just tripped cannot be considered as a faulty *
*    element.                                                              *
* If a breaker is accepted as a faulty breaker, then the elements connected to *
* it are also considered as faulty elements, and are added to the list.    *
* All patterns of faults of the elements accepted as faulty are            *
* kept in a variable called CUM_LIST (cumulative list).                    *
* The variable SEARCH_LIST will contain all faulty elements.               *
*                                                                          *
****************************************************************)
``` procedure build_search_list;

var i, j, k, m, n, bit_mask: integer;
    aux: pattern_of_fault;
    all_bits_one: boolean;

begin
    k := 0;
    cum_list := all_ones;
    for i := 1 to size_of_fault_list do begin
        all_bits_one := true;
        for j := 1 to n_of_words do begin
            aux[j] := (~(current_pattern[j])) | pattern[i][j];
            all_bits_one := all_bits_one and (aux[j] = ~(0));
        end;
        if i > size_of_fault_list - n_of_breakers then begin
            m := i - (n_of_lines + n_of_buses + n_of_tbs + n_of_gens);
            bit_mask := (1 << (size_of_word - 1));
            bit_mask := bit_mask >> ((m - 1) mod size_of_word);
            n := ((m - 1) div size_of_word) + 1;
            if (current_pattern[n] & bit_mask = 0) then
                                            all_bits_one := false;
        end;
        if all_bits_one then begin
            k := k+1;
            search_list[k] := fault[i];
            for j := 1 to n_of_words do
                cum_list[j] := cum_list[j] & pattern[i][j];
            if i > size_of_fault_list - n_of_breakers then begin
                for j := 1 to n_of_elmts do begin
                    k := k + 1;
                    search_list[k] := trip[m][j];
                end;
            end;
        end;
    end;
    length_of_search_list := k;
end;

(*******************************************************************
*
*                    WRITE_SEARCH_LIST
*
********************************************************************
*
*       This procedure writes each element in the SEARCH_LIST to
*   the user. Nevertheless, it will write only the elements in the
*   SEARCH_LIST that do not belong to the OLD_SEARCH_LIST, that is,
*   it will write only the new faulty elements.
*
*******************************************************************)

procedure write_search_list;

const
    msg_fault = 'Fault in: ';
    msg_no_fault = 'There is no new fault.';

var i, j: integer;
    old, new_fault: boolean;

begin
    new_fault := false;
    for i := 1 to length_of_search_list do begin
        old := false;
        j := 1;
        while (not old) and (j <= length_of_old_list) do begin
            if search_list[i] = old_search_list[j] then old := true
                                            else j := j + 1;

```
            end;
        if not old then begin
            new_fault := true;
            writeln (ttyout, msg_fault, search_list[i]);
        end;
    end;
    if not new_fault then writeln (ttyout, msg_no_fault);
    for i := 1 to length_of_search_list do
                         old_search_list[i] := search_list[i];
    length_of_old_list := length_of_search_list;
end;
```

(*****************************************************************
 *
 *                  WRITE_BREAKERS_TRIPPED
 *
 ******************************************************************
 *
 *      This procedure writes to the user the breakers that tripped without
 *  any fault associated to them. Only those breakers that were not presented
 *  before to the user, will be presented now.
 *
 *****************************************************************)

procedure write_breakers_tripped;

const
    msg_trip = 'Breaker Trip: ';

var i, j, k: integer;
    aux: pattern_of_fault;
    all_bits_one: boolean;
    bit_mask: integer;

begin
    all_bits_one := true;
    for i := 1 to n_of_words do begin
        aux[i] := ^cum_list[i] | new_pattern[i];
        all_bits_one := all_bits_one and (aux[i] = ^(0));
    end;
    if not all_bits_one then begin
        for i := 1 to n_of_words do begin
            bit_mask := ((^(0)) << (size_of_word - 1));
            if (aux[i] <> ^(0)) then begin
                for j := 1 to size_of_word do begin
                    if (aux[i] & bit_mask) = 0 then begin
                        k := ((i - 1) * size_of_word) + j;
                        writeln (ttyout, msg_trip, breaker[k]);
                    end;
                    bit_mask := bit_mask >> 1;
                end;
            end;
        end;
    end;
end;

(*****************************************************************
 *
 *                  M A I N   P R O G R A M
 *
 *****************************************************************)

var time0, time1, time2: integer;
    no_breakers: boolean;

```
begin
    termout (ttyout);
    termin (ttyin, 'UCASE');
    initialize_variables;
    time0 := clock;
    read_data_base;
    time1 := clock;
    writeln (ttyout, 'The database was read in ',
                    ((time1-time0) div 1000): 3, ' msec.');
    while true do begin
        no_breakers := get_breakers;
        if no_breakers then return;
        time1 := clock;
        build_search_list;
        write_search_list;
        write_breakers_tripped;
        time2 := clock;
        writeln (ttyout, 'The analysis was completed in',
                    ((time2-time1) div 1000): 3, ' msec.');
    end;
end.
```

What is claimed is:

1. A method for processing a set of alarms generated by a fault in one or more components of a predetermined system, said method comprising the steps (a) providing a computer database representative of all components of the system capable of faulting and the interconnections between said components;

(b) defining rules that relate component faults to generated alarms and to propagation of component faults within the system;

(c) determining individual alarm patterns generated by separate failure of each component within the system using said representative database of components and interconnections and said rules relating component faults to alarms;

(d) storing in computer means said individual alarm patterns determined for each component of the system;

(e) accomplishing steps (a)–(d) before said set of alarms to be analyzed is generated; and (f) comparing each stored alarm pattern with the generated set of alarms and ascertaining those components whose individual alarm patterns are a subset of the set of alarms, said components being potential faulted components of the system.

2. The method of claim 1, wherein said comparing and ascertaining step (f) occurs in real time, and wherein said steps (c) and (d) further include the step of:

hashing each of said individual alarm patterns determined for each component of the system to a binary pattern corresponding to a unique integer number and storing said binary patterns in said computer means;

and wherein said step (f) further includes the steps of:

hashing the set of alarms into a binary representation; and comparing said alarm set binary representation with all binary patterns stored for said system components and ascertaining therefrom all potentially faulted components of the system.

3. The method of claim 2, wherein said binary representation comparing includes the steps of:

complementing all bits in said alarm set binary representation; and performing a bitwise OR operation on said alarm set binary representation with the binary patterns of all components of the system, said components whose binary patterns result in a number containing all bits equal to "1" after the bitwise OR operation being considered potential faulted components.

4. The method of claim 3, wherein a plurality of the components of said predetermined system comprise protective breakers dispersed throughout the system, tripping of one or more of said breakers resulting in generation of said set of alarms, and wherein if one of said potentially faulted components of the system is a breaker said method further comprises the step of determining whether said potentially faulted breaker comprises a stuck breaker.

5. The method of claim 4, wherein said method is capable of identifying improper breaker trips, said method further including the steps of:

performing a bitwise AND operation among all stored binary patterns associated with the potentially faulty components ascertained in step (f) to produce a cumulative binary pattern; and comparing said cumulative binary pattern with said alarm set binary representation, those bits in said alarm set binary representation hashing a pattern of open breakers with no equivalent representation in said cumulative binary pattern identifying a protective breaker that tripped with no fault associated therewith.

6. The method of claim 1, wherein a plurality of the components of said predetermined system comprise protective breakers, said breakers being dispersed throughout said system, and wherein said step (a) includes representing each component of the system and its interconnections by the breakers associated therewith.

7. The method of claim 6, wherein said rules provided in step (b) include:

a fault in a component trips all breakers associated with that component; and a stuck breaker connected to a faulty component propagates the fault through the faulty breaker to other components connected thereto, tripping other breakers connected to said other components.

8. The method of claim 7, wherein said comparing step (f) uses the following rules:

where a stuck breaker exists, a fault occurred in at least one component connected to said breaker, and said components connected to said breaker are identified as potential faulted components; and a complex set of alarms can be decomposed into subsets of alarms, each of said alarm subsets being generated by a fault occurring in a single system component.

9. The method of claim 1, wherein a plurality of alarm sets are generated and said method further comprises repeating step (f) for each of the plurality of alarm sets generated.

10. The method of claim 9, further comprising the step of providing an information signal to an operator of said predetermined system identifying all potential faulted components of the system.

11. A method for processing a set of alarms generated by a fault in one or more components of a predetermined power network, said components including a plurality of breakers dispersed throughout said network, said alarm set being generated by the tripping of one or more of said breakers, said method comprising the steps of:

(a) creating a computer database representative of all components of the system capable of faulting and the interconnections between said components, including said breakers;

(b) defining rules that relate component faults to generated alarms and to propagation of component faults within the network;

(c) determining the pattern of breakers that trip with separate faulting of each component of the network using said representative database of components and interconnections and said rules relating component faults to alarms;

(d) storing in computer means the brea pattern associated with faulting of each component of the system;

(e) accomplishing steps (a)-(d) before said set of alarms to be analyzed is generated; and (f) comparing each stored breaker pattern with the generated set of alarms and ascertaining those components whose individual alarm patterns are a subset of the set of alarm, said components being potential faulted components of the system.

12. The method of claim 11, wherein said power network comprises a power distribution system and the components of said system include transmission lines, transformer banks, buses, and generators, and wherein said rules provided in said step (b) relating component faults to generated alarms and propogation of component faults within the system include:

(i) a fault in a transmission line trips all breakers connected to that line;

(ii) a fault in a transformer bank trips all breakers connected to that transformer;

(iii) a fault in a bus trips all breakers connected to that bus;

(iv) a fault in a generator trips all breakers connected to that generator; and (V) where a fault occurs in a bus, generator, transformer bank or transmission line with a faulty breaker connected thereto, the fault propagates through the faulty breaker to other components connected to said breaker, tripping other breakers according to the rules (i)-(iv).

13. The method of claim 12, further comprising the step of providing pattern recognition rules for use in said comparing step (e), said pattern recognition rules including:

where a faulted breaker is detected through the analysis of alarms, then a fault must have occurred in at least one component connected to said faulted breaker, and all components connected thereto are reported as potential faulted components; and a complex alarm set can be decomposed into subsets of alarms, each of said alarm subsets being generated by a fault occurring in a single system component.

14. The method of claim 13, wherein said comparing and ascertaining step (f) occurs in real time, and wherein said steps (c) and (d) further include the step of:

hashing each of said individual breaker patterns determined for each component of the system to a binary pattern corresponding to a unique integer number and storing said binary pattern in said computer means;

and wherein said step (f) further includes the steps of:

hashing the set of alarms into a binary representation; and comparing said alarm set binary representation with all binary patterns stored for said system components and ascertaining therefrom all potentially faulted components of the system.

15. The method of claim 14, wherein said binary representation comparing includes the steps of:

complementing all bits in said alarm set binary representation; and performing a bitwise OR operation on said alarm set binary representation with the binary patterns of all components of the system, said components whose binary patterns result in a number containing all bits equal to "1" after the bitwise OR operation being considered potential faulted component.

16. The method of claim 15, further comprising the step of providing an information signal identifying all potential faulty components of the system.

17. The method of claim 16, wherein said set of alarms is updated periodically and said method further comprises repeating step (f) for each of said updated alarm sets.

18. The method of claim 17, further comprising the steps of:

storing each periodically updated alarm set in a database; and combining successive alarm sets into a superset and repeating step (f) for each of said alarm supersets.

* * * * *

UNITED STATES PATENT AND TRADEMARK OFFICE
CERTIFICATE OF CORRECTION

PATENT NO. : 4,977,390

DATED : December 11, 1990

INVENTOR(S) : Saylor et al.

It is certified that error appears in the above-identified patent and that said Letters Patent is hereby corrected as shown below:

```
Column 1, line 2, substitute --alarms-- for "alaarms".
Column 1, line 15, substitute --Management-- for "Managment".
Column 1, line 59, insert --.-- between "breakers" and "When".
Column 1, line 62, insert --.-- between "breakers" and "The".
Column 1, line 65, insert --.-- between "breakers" and "However".
Column 3, line 6, substitute --a-- for "an" (second occurrence).
Column 3, line 45, insert --and-- between "available" and "marketed".
Column 4, line 65, substitute --information-- for "inforamtion".
Column 7, line 56, substitute --the-- for "they".
Column 8, line 64, substitute --B-2-- for "B2".
Column 10, line 51, substitute --program-- for "proram".
Column 10, line 66, insert --;-- after "generators".
Column 12, line 44, substitute --The-- for "They" (second occurrence).
Column 12, line 62, substitute --fields-- for "fileds".
Column 14, line 46, substitute --the-- for "te".
Column 14, line 56, substitute --corresponds-- for "corressponds".
Column 15, line 9, substitute --only-- for "ony".
Column 16, line 14, substitute --elements-- for "elelments".
Column 18, line 2, substitute --representation-- for "representaiton".
Column 18, line 36 substitute --addition-- for "additon".
```

UNITED STATES PATENT AND TRADEMARK OFFICE
CERTIFICATE OF CORRECTION

PATENT NO. : 4,977,390

DATED : December 11, 1990

INVENTOR(S) : Saylor et al.

It is certified that error appears in the above-identified patent and that said Letters Patent is hereby corrected as shown below:

Column 19, lines 15-29 should read as follows:

```
--ALEXPAS:
    CONST
        n_of_stations = 2;
        n_of_breakers = 12;
        n_of_lines = 2;
        size_of_string = 30;
              .
              .
    TYPE:
        element = string (size_of_string);
        station_list = packed array [1..n_of_stations] of element;
        line_list = packed array [1..n_of_lines] of element;
              .
              .
    VAR:
        station: station_list;
        breaker: breaker_list;
        line: line_list;
              .
              .--
```

Column 19, line 30, substitute -- _ -- for "13".
Column 19, line 36, substitute -- _ -- for "13".
Column 19, line 39, substitute -- _ -- for "13".
Column 19, lines 46-48, substitute -- _ -- for "13".
Column 20, lines 1-4, substitute -- _ -- for "13".

UNITED STATES PATENT AND TRADEMARK OFFICE
CERTIFICATE OF CORRECTION

PATENT NO. : 4,977,390

DATED : December 11, 1990

INVENTOR(S) : Saylor et al.

It is certified that error appears in the above-identified patent and that said Letters Patent is hereby corrected as shown below:

Column 65, line 37, substitute --breaker-- for "brea".

Signed and Sealed this

Nineteenth Day of May, 1992

Attest:

DOUGLAS B. COMER

Attesting Officer

Acting Commissioner of Patents and Trademarks